United States Patent
Takeuchi et al.

(10) Patent No.: US 7,193,759 B2
(45) Date of Patent: Mar. 20, 2007

(54) SCANNING OPTICAL SYSTEM

(75) Inventors: Shuichi Takeuchi, Saitama-ken (JP); Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 62 days.

(21) Appl. No.: 10/623,692

(22) Filed: Jul. 22, 2003

(65) Prior Publication Data
US 2004/0109213 A1 Jun. 10, 2004

(30) Foreign Application Priority Data
Jul. 23, 2002 (JP) ............................. 2002-214380

(51) Int. Cl.
*G02B 26/08* (2006.01)
(52) U.S. Cl. ..................... 359/216; 359/204; 359/207
(58) Field of Classification Search ........ 359/205–207, 359/216; 347/258–261
See application file for complete search history.

(56) References Cited

U.S. PATENT DOCUMENTS

| | | | |
|---|---|---|---|
| 5,095,383 A * | 3/1992 | Omura et al. ............... | 359/216 |
| 5,191,463 A | 3/1993 | Minoura | |
| 5,646,767 A | 7/1997 | Iima et al. | |
| 5,661,587 A * | 8/1997 | Iwasaki ...................... | 359/205 |
| 5,946,126 A | 8/1999 | Takeuchi | |
| 6,853,470 B2 | 2/2005 | Takakubo | |
| 6,954,222 B2 | 10/2005 | Iizuka et al. | |
| 2004/0036974 A1 * | 2/2004 | Iizuka et al. | |

FOREIGN PATENT DOCUMENTS

| | | |
|---|---|---|
| JP | 3-5562 | 1/1991 |
| JP | 5-346553 | 12/1993 |
| JP | 7-230051 | 8/1995 |
| JP | 7-287180 | 10/1995 |
| JP | 10-073778 | 3/1998 |
| JP | 11-84303 | 3/1999 |
| JP | 2001-305459 | 10/2001 |

OTHER PUBLICATIONS

English Language Abstract of JP 10-073778.
Panasonic Polygon Mirror-Scanner Motor MASQ Series, Catalog 1997-1998.

* cited by examiner

*Primary Examiner*—James Phan
(74) *Attorney, Agent, or Firm*—Greenblum & Bernstein, P.L.C.

(57) ABSTRACT

There is provided a scanning optical system, which is provided with a light source that emits at least one beam, a polygonal mirror, and an imaging optical system that converges the at least one beam deflected by the polygonal mirror to form at least one beam spot on a surface to be scanned. The at least one beam incident on the polygonal mirror is inclined in an auxiliary scanning direction which is perpendicular to the main scanning direction. Further, at least one lens surface of the imaging optical system is configured such that a beam reflected therefrom proceeds toward an outside region of the polygonal mirror.

38 Claims, 10 Drawing Sheets

SCANNING OPTICAL SYSTEM

BACKGROUND OF THE INVENTION

The present invention relates to a scanning optical system which is employed in, for example, a laser beam printer.

In a scanning optical system for a laser beam printer, a laser beam emitted by a laser diode is deflected by a polygonal mirror having a plurality of reflective surfaces to scan within a predetermined angular range. The scanning beam passes through an imaging optical system which converges the deflected laser beam to form a scanning beam spot onto a surface to be scanned such as a photoconductive surface. As the polygonal mirror rotates, the beam spot moves on the photoconductive surface. By ON/OFF modulating the beam spot as it moves, an electrostatic latent image is formed on the photoconductive surface.

One of important items to be considered in designing the scanning optical system is to prevent occurrence of ghost images on the photoconductive surface. For example, such a ghost image is caused by undesired reflections on surfaces of lenses of the imaging optical system.

More specifically, when a beam impinges on a surface of a lens provided in the imaging optical system, a potion of the beam (i.e., an undesired beam) is reflected by the surface of the lens and proceeds back to the polygonal mirror along a direction which is defined by a shape of the surface of the lens and an incident angle of the beam with respect to the surface of the lens. If the undesired beam is incident on the polygonal mirror, the undesired beam is reflected again by the polygonal mirror.

In a case where the undesired beam proceeds back to the polygonal mirror, if the undesired beam impinges on one of the reflective surfaces reflecting (i.e., deflecting) the laser beam from the light source (hereafter the one of the surface is referred to as a reflective surface A), the undesired beam reflected by the surface A may impinge on the photoconductive surface. However, in this case, the undesired beam scans on the photoconductive surface at a speed substantially the same as a scanning speed of a normal beam spot. In addition, intensity of the undesired beam is sufficiently low. Accordingly, the undesired beam reflected by the reflective surface A does not cause a problem of ghost images.

On the contrary, if the undesired beam impinges on another reflective surface (i.e., a reflective surface which is not reflecting the laser beam from the light source), the undesired beam may scan on the photoconductive surface at a relatively low speed. In this case, depending on a shape of the lens surface in the main scanning direction, the undesired beam may remain at substantially the same position on the photoconductive surface. If such a phenomenon occurs, ghost images appears on the photoconductive surface, and therefore imaging quality deteriorates.

If reflectivity of each of surfaces of lenses in the imaging optical system is zero, ghost images can be removed completely. However, in order to lower the reflectivity of the surface of the lens, a greater number of layers of coating are required. This increases manufacturing cost of the lens. It should be appreciated that to lower the reflectivity of the surface of the lens to completely zero is impossible. Therefore, it is impossible to remove the ghost images completely by using an antireflective coating.

In addition, in many cases, plastic lenses having aspherical surfaces are employed in the imaging optical system so as to reduce manufacturing cost of the scanning optical system. However, the plastic lens has a disadvantage in adhesiveness between the layers of coating and a surface of the plastic lens in comparison with glass lenses.

SUMMARY OF THE INVENTION

The present invention is advantageous in that it provides a scanning optical system which is configured to completely remove ghost images on a surface to be scanned and to reduce manufacturing cost thereof.

According to an aspect of the invention, there is provided a scanning optical system for emitting at least one beam scanning in a main scanning direction, which is provided with a light source that emits the at least one beam, a polygonal mirror that rotates and deflects the at least one beam to scan in the main scanning direction, and an imaging optical system that converges the at least one beam deflected by the polygonal mirror to form at least one beam spot on a surface to be scanned, the at least one beam spot scanning in the main scanning direction on the surface to be scanned.

In the above configuration, the at least one beam incident on the polygonal mirror is inclined in an auxiliary scanning direction which is perpendicular to the main scanning direction. Further, at least one lens surface of the imaging optical system is configured such that a beam reflected therefrom is not incident on reflective surfaces of the polygonal mirror.

With this configuration, since the beam (i.e., an undesired beam) reflected from the at least one lens surface does not impinge on the reflection surface of the polygonal mirror, occurrence of ghost images is prevented.

Optionally, the imaging optical system may include a lens having the at least one lens surface, the lens being positioned such that an optical axis of the lens is perpendicular to a rotational axis of the polygonal mirror.

Still optionally, a position at which the at least one beam emitted by the light source impinges on the polygonal mirror may substantially coincide with an intersection of the polygonal mirror and the optical axis of the lens.

Still optionally, the intersection may substantially coincide with a center position of a reflective surface of the polygonal mirror in a direction of the rotational axis of the polygonal mirror.

In a particular case, the imaging optical system may include a lens having the at least one lens surface, the lens being made of plastic.

In a particular case, the imaging optical system may include a lens having the at least one lens surface, the at least one lens surface being symmetrical with respect to an optical axis of the lens in the auxiliary scanning direction.

In a particular case, the imaging optical system may include a lens having the at least one lens surface, and the lens may face the polygonal mirror. In this configuration, the lens and the polygonal mirror are configured so as to satisfy a condition:

$$H/2 < |2\beta D(D - R_{Z1})/R_{Z1}| \quad (1)$$

where H represents a thickness of the polygonal mirror in the auxiliary scanning direction, $\beta$ represents an incident angle of the at least one beam with respect to a reflective surface of the polygonal mirror in the auxiliary scanning direction, D represents a distance between the reflective surface of the polygonal mirror and the lens, and $R_{Z1}$ represents a radius of curvature of the at least one lens surface of the lens in the auxiliary scanning direction.

Optionally, the imaging optical system may include a lens having the at least one lens surface, and an other surface of the lens may be configured such that a beam reflected therefrom proceeds toward an outside region of the polygonal mirror.

Still optionally, the lens may face the polygonal mirror, and the lens and the polygonal mirror may be configured so as to satisfy a condition:

$$H/2 < |\beta D(D-L_Z)/L_Z$$

$$L_Z = R_{Z1} R_{Z2} D / (2N R_{Z1} D - 2(N-1) R_{Z2} D - R_{Z1} R_{Z2}) \quad (2)$$

where H represents a thickness of the polygonal mirror in the auxiliary scanning direction, $\beta$ represents an incident angle of the at least one beam with respect to a reflective surface of the polygonal mirror in the auxiliary scanning direction, D represents a distance between the reflective surface of the polygonal mirror and the lens, $R_{Z1}$ represents a radius of curvature of the at least one lens surface of the lens in the auxiliary scanning direction, $R_{Z2}$ represents a radius of curvature of the other lens surface of the lens in the auxiliary scanning direction, and N represents a refractive index of the lens at a design wavelength.

In a particular case, the beam reflected by the at least one lens surface may proceed above a top surface of the polygonal mirror.

Alternatively, the beam reflected by the at least one lens surface may proceed below a bottom surface of the polygonal mirror.

Optionally, the imaging optical system may have a scanning lens, and a compensation lens provided on the surface to be scanned side with respect to the scanning lens, the compensation lens compensating for curvature of field. In this configuration, the scanning lens has the at least one lens surface, at least one surface of the scanning lens is formed to be an anamorphic aspherical surface, and at least one surface of the compensation lens is formed to be an aspherical surface defined by a two-dimensional polynomial expression.

Still optionally, the at least one lens surface of the scanning lens may be symmetrical with respect to an optical axis of the scanning lens in the auxiliary scanning direction.

Optionally, one surface of the scanning lens may be formed to be an anamorphic aspherical surface, and an other surface of the scanning lens may be formed to be a toric surface.

Optionally, the at least one beam may include a plurality of beams. In this case, the polygonal mirror deflects the plurality of beams to scan in the main scanning direction, and the imaging optical system converges the plurality of beams deflected by the polygonal mirror to form a plurality of beam spots on respective surfaces to be scanned, the plurality of beam spots scanning in the main scanning direction on the respective surfaces to be scanned. Further, the plurality of beams incident on the polygonal mirror are inclined In the auxiliary scanning direction.

Still optionally, the imaging optical system may have a scanning lens, and a plurality of compensation lenses provided on the surfaces to be scanned side with respect to the scanning lens, each of the compensation lenses compensating for curvature of field. In this case, the plurality of beams deflected by the polygonal mirror pass through the scanning lens, and the plurality of beams emerged from the scanning lens pass through the plurality of the compensation lenses, respectively.

Still optionally, optical paths of the plurality of beams between the polygonal mirror and the scanning lens may be symmetrical with respect to an optical axis of the scanning lens.

BRIEF DESCRIPTION OF THE ACCOMPANYING DRAWINGS

DETAILED DESCRIPTION OF THE EMBODIMENTS

Hereinafter, embodiments according to the invention are described with reference to the accompanying drawings.

First Embodiment

A configuration of a so-called tandem type scanning optical system 10 according to a first embodiment of the invention will be described with reference to FIGS. 1 and 2.

Figure 1:
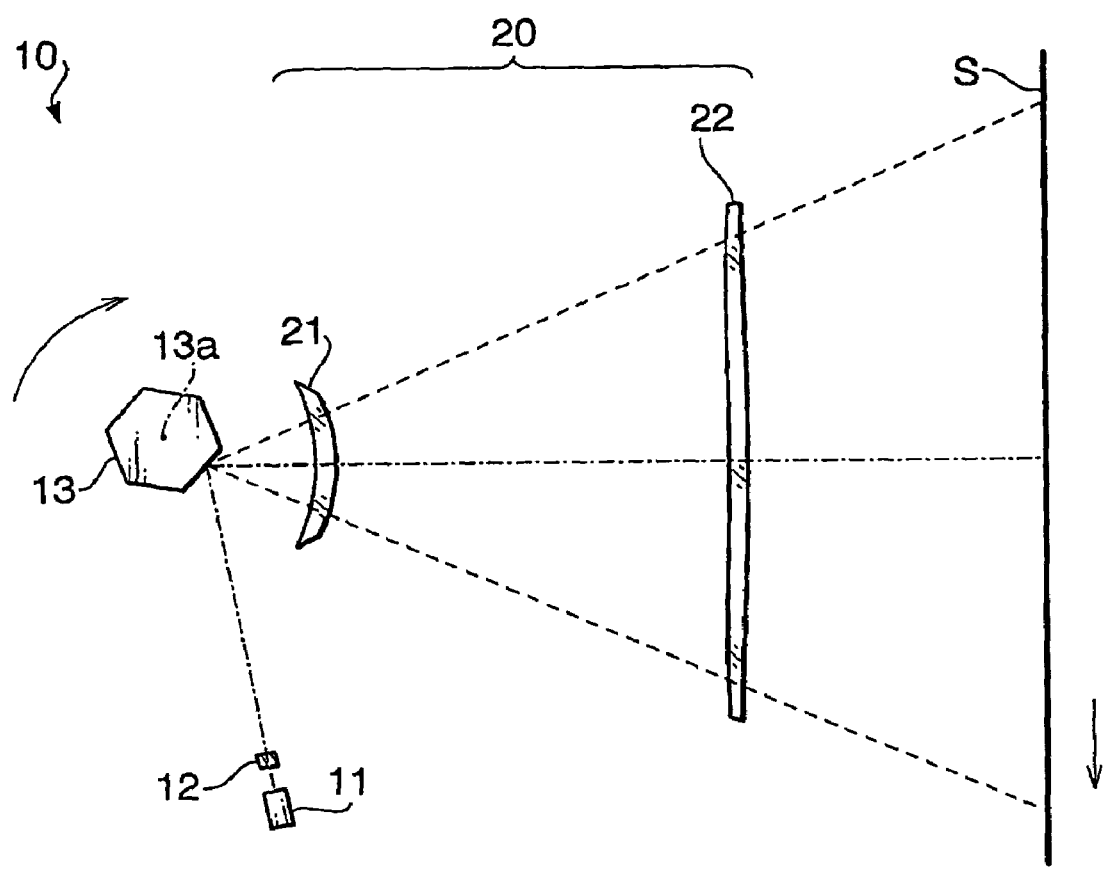
FIG. 1 is a developed view of a scanning optical system according to a first embodiment of the Invention viewed along a line parallel with a rotational axis of a polygonal mirror.

FIG. 1 is a developed view of the scanning optical system 10 viewed along a line parallel with a rotational axis 13a of a polygonal mirror 13. FIG. 2 is a side view of the scanning optical system 10 on a photoconductive drum side. Although the scanning optical system 10 includes four sets of mirrors 23 and 24, and compensation lenses 22 so as to make color images on a sheet, FIG. 1 shows one of the sets for the sake of simplicity. A surface S to be scanned in FIG. 1 corresponds to a photoconductive drum 60.

As shown in FIG. 1, the scanning optical system 10 includes a light source unit 11 which emits four laser beams, a cylindrical lens 12, a polygonal mirror 13, and an fθ lens 20.

Hereinafter, a direction, on a surface S to be scanned, in which a beam spot moves as the polygonal mirror 13 rotates is referred to as a main scanning direction, and a direction perpendicular to the main scanning direction, on the surface S, is referred to as an auxiliary scanning direction.

The light source unit 11 includes four laser diodes, and four collimator lenses (not shown) which collimate divergent beams emitted by the laser diodes, respectively. Each of beams collimated by the collimator lens is converged by a cylindrical lens 12 which has a positive power only in the auxiliary scanning direction.

Further, the beams emerged from the cylindrical lens 12 are incident on substantially the same position on a reflective surface of the polygonal mirror 13. Due to the refraction power of the cylindrical lens 12, a line-like image, which extends in the main scanning direction, is formed on a plane closely adjacent to the reflective surface of the polygonal mirror 20.

Incident angles of four laser beams in the auxiliary scanning direction with respect to the polygonal mirror 13 are different from each other. The four beams intersect with each other substantially at the same position on the reflective surface of the polygonal mirror 13. Therefore, the width of the polygonal mirror 13 can be reduced.

Figure 2:
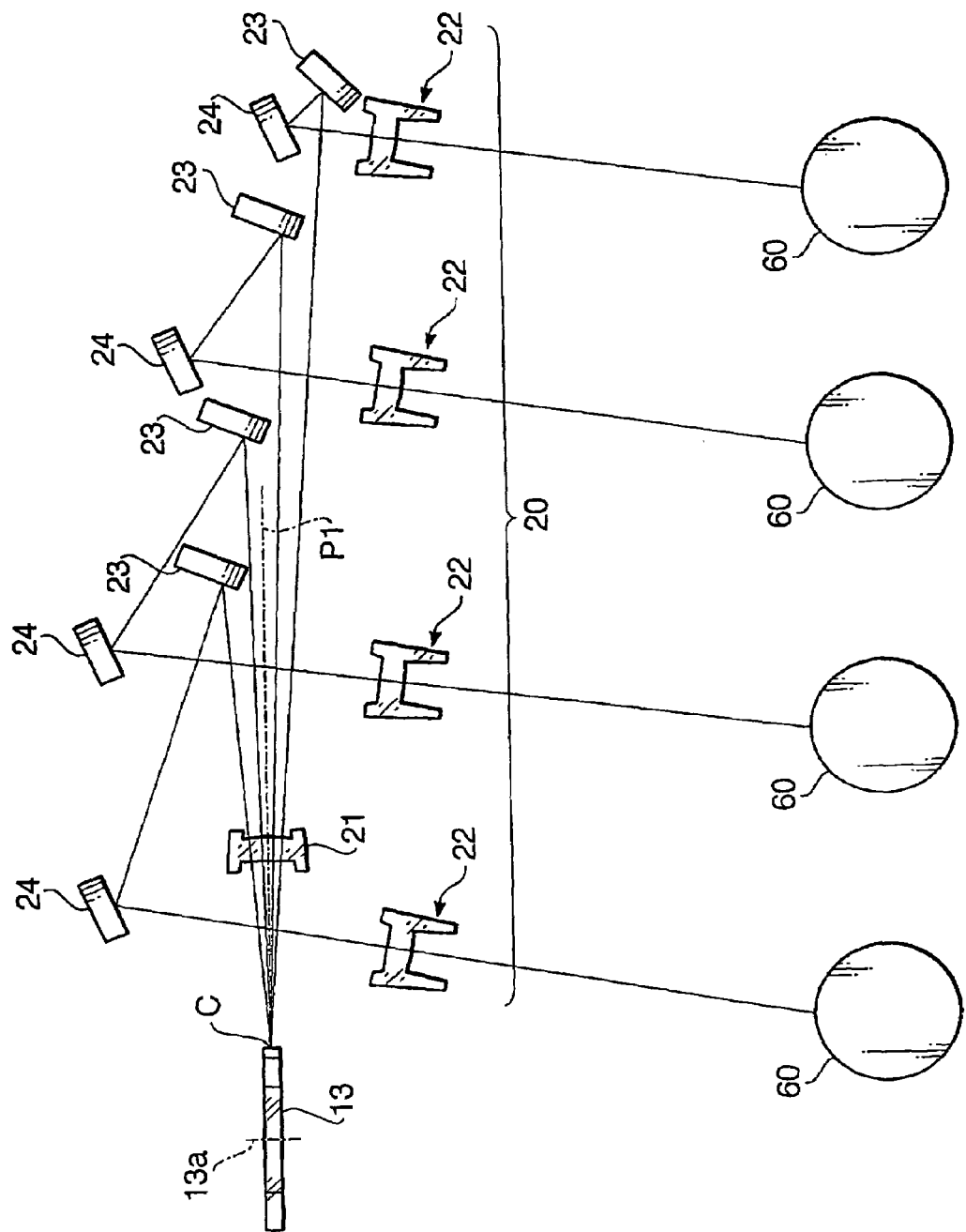
FIG. 2 is a side view of the scanning optical system shown in FIG. 1 on a photoconductive drum side.

As shown in FIG. 2, the four beams emitted by the light source unit 11 are simultaneously deflected by the polygonal mirror 13 rotating about its rotational axis 13a.

The light source unit 11 is arranged such that laser beams emitted by the light source unit 11 are incident on the polygonal mirror 13 from the outside of a predetermined scanning range within which each laser beam is deflected by the polygonal mirror 13. Optical paths of the laser beams between the polygonal mirror 13 and a scanning lens 21 of the fθ lens 20 are different from each other, and are symmetrical in the auxiliary scanning direction with respect to an optical axis P1 of the scanning lens 21.

Each of the laser beams emerged from the scanning lens 21 is reflected by a pair of mirrors 23 and 24, and passes through the corresponding compensation lens 22. Then, each beam is converged onto the corresponding photoconductive drum 60 to form a scanning beam spot. With the above configuration, when the polygonal mirror 13 rotates about the rotational axis 13a, scanning lines are formed on the four photoconductive drums 60, respectively.

The scanning optical system 10 is employed, for example, in a color laser beam printer which forms color images by printing black, cyan, yellow and magenta images on a sheet in an overlaid fashion. In the scanning optical system 10, the four sets of the plurality of compensation lenses 22 and the plurality of photoconductive drums 60 correspond to black, cyan, yellow and magenta components, respectively.

As described above, each beam reflected from the reflective surface of the polygonal mirror 13 proceeds toward the fθ lens 20 as a divergent beam, and then is converged by the fθ lens 20 onto the surface S. Therefore, the reflective surface of the polygonal mirror 13 and the surface S are conjugate surfaces, which prevents occurrences of deviation of a scanning line from a predetermined position caused by a tilt error of the reflective surfaces of the polygonal mirror 13.

As shown FIG. 1, the fθ lens 20 includes the scanning lens 21 and the compensation lens 22 which is located on the photoconductive drum side. The scanning lens 21 has power mainly in the main scanning direction. The compensation lens 22 has power mainly in the auxiliary scanning direction and is configured to compensate for curvature of field and an fθ error.

The optical axis of the scanning lens 21 coincides with a optical path of the beam impinges on the surface at a center position of a scanning line (i.e., an image height of zero). Further, the optical axis of the scanning lens is perpendicular to the rotational axis 13a of the polygonal mirror.

A position C at which the beam emitted by the light source impinges on the polygonal mirror substantially coincides with an intersection of the polygonal mirror and the optical axis P1 of the scanning lens 21 (see FIG. 2). The intersection substantially coincides with a center position in a direction of the rotational axis of the polygonal mirror.

Hereinafter, an average position at which the beams from the light source unit 11 impinge on the reflection surface of the polygonal mirror is referred to as a deflection point.

Hereinafter, a plane which is perpendicular to the rotational axis 13a of the polygonal mirror 13 and includes the optical axis of the scanning lens 21 is referred to as a main scanning plane. Further, a plane which is parallel with the rotational axis 13a of the polygonal mirror 13 and includes the optical axis of the scanning lens 21 is referred to as an auxiliary scanning plane. When a lens surface is not a rotationally symmetrical surface, an optical axis of the lens surface corresponds to an axis passing through an origin point of the lens surface (i.e., a reference point) used for mathematically defining the lens surface.

As shown in FIG. 2, each of the four laser beams deflected by the polygonal mirror 13 is reflected by the pair of mirrors 23 and 24. It should be noted that optical components shown in FIG. 2 are arranged so that optical path lengths of the four laser beams between the polygonal mirror 13 and the photoconductive drum 60 are equal to each other. With this structure, the scanning optical system 10 can be downsized. Also, optical path lengths between the compensation lenses 22 and the respective photoconductive drums 60 are equal to each other.

Figure 3:
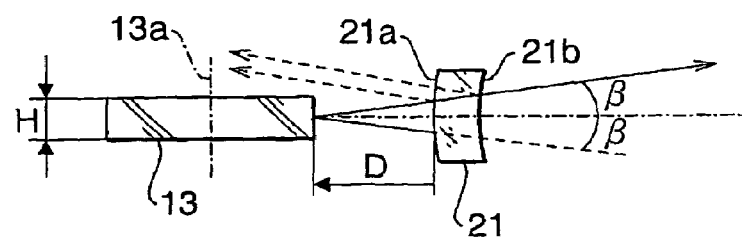
FIG. 3 is a side view of the scanning optical system shown in FIG. 1 illustrating optical paths of undesired beams.

Next, a configuration to remove ghost images according to the first embodiment will be described in detail with reference to FIG. 3 which is a side view of the scanning optical system 10 illustrating optical paths of undesired beams. As shown in FIG. 3, the laser beam reflected by the reflective surface of the polygonal mirror 13 is obliquely incident on the scanning lens 21 in the auxiliary scanning direction.

It is appreciated that by selecting appropriate values as to a distance D between the reflective surface of the polygonal mirror 13 and the scanning lens 21, an incident angle β which the beam impinging on the reflective surface of the polygonal mirror 13 forms with respect to the optical axis of the scanning lens 21 in the auxiliary scanning direction, and a radius of curvature $R_{Z1}$ of a surface 21a (a polygonal mirror side surface) of the scanning lens 21, it is possible to direct an undesired beam reflected from the surface 21a to pass above a top surface of the polygonal mirror 13. That is, it is possible to direct the undesired beam so as not to impinge on the reflective surface of the polygonal mirror.

More specifically, the scanning optical system 10 according to the first embodiment is configured to satisfy a condition:

$$H/2 < 2\beta D(D-R_{Z1})/R_{Z1} \quad (3)$$

where H represents the thickness of the polygonal mirror 13 (i.e. a size of the polygonal mirror 13 in the auxiliary scanning direction).

Hereafter, a concrete example which satisfies the above condition (3) will be described in detail.

FIRST EXAMPLE

Figure 4:
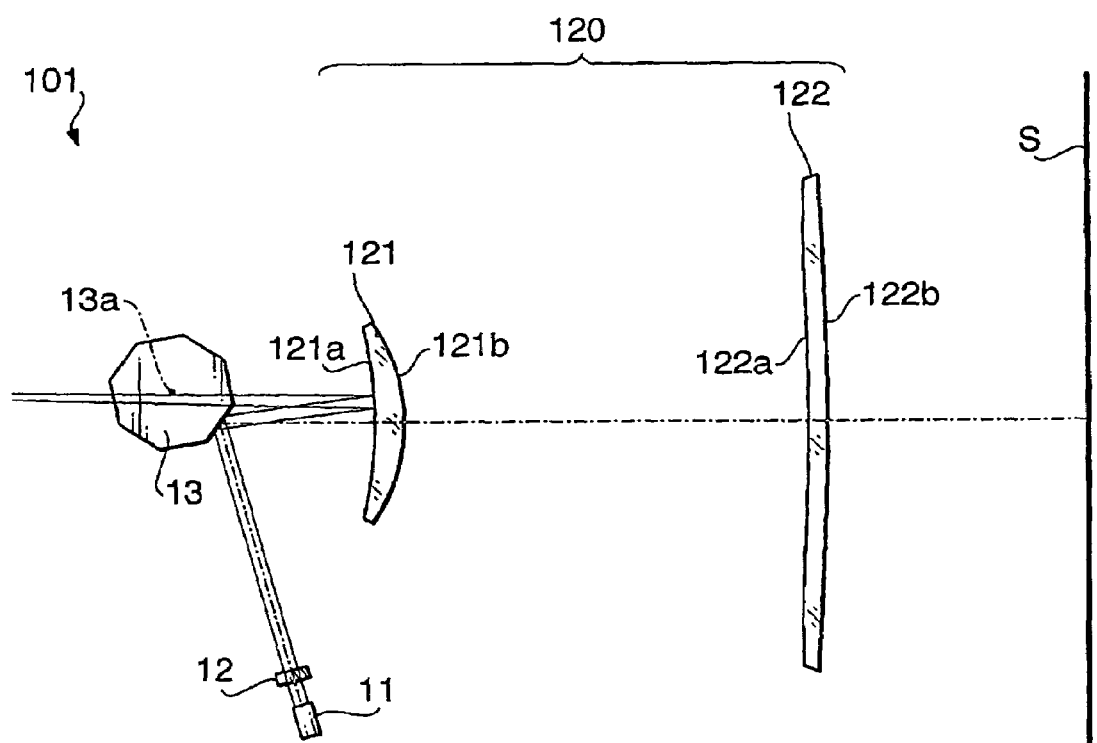
FIG. 4 is a developed view of a scanning optical system according to a first example viewed along the rotational axis of the polygonal mirror.
Figure 5:
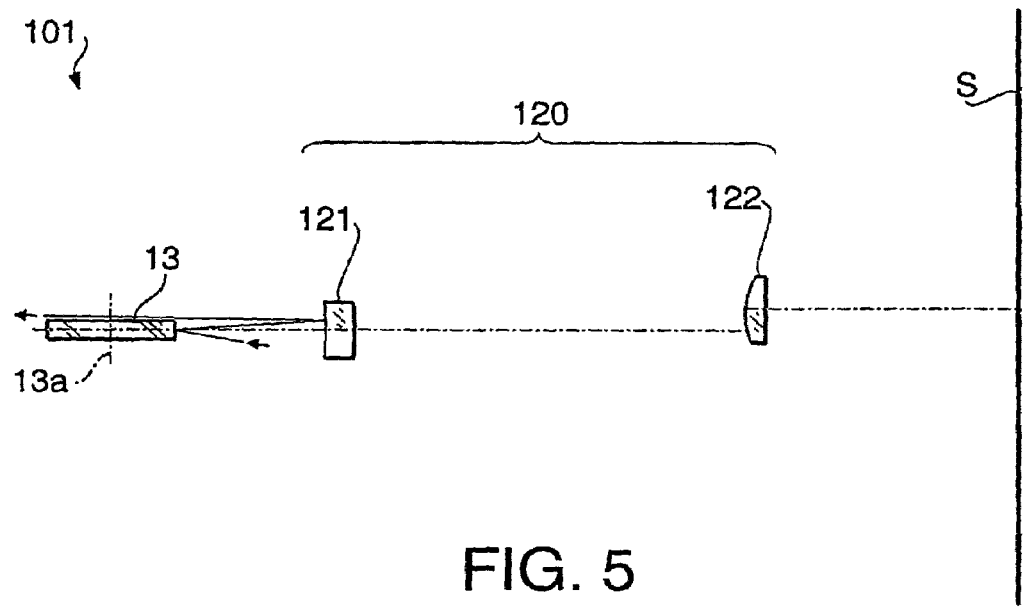
FIG. 5 is a developed view of the scanning optical system shown in FIG. 4 viewed from a line parallel with the main scanning direction.

FIG. 4 is a developed view of a scanning optical system 101 according to a first example viewed along the rotational axis 13a of the polygonal mirror 13. FIG. 5 is a developed view of the scanning optical system 101 viewed from a line parallel with the main scanning direction. It should be noted that in each of FIGS. 4 and 5, only an optical path of the undesired beam reflected from a surface 121a of the scanning lens 121 is indicated and optical paths of normal beams which are not reflected by surfaces of the scanning lens 121 are omitted for the sake of simplicity.

In the first example, a total focal length of a fθ lens 120 is 235 mm, a scanning width is 216 mm, and a design wavelength is 780 nm. The thickness H of the polygonal mirror 13 is 3.0 mm, a deflection angle α which the beam impinging on the polygonal mirror forms with respect to the optical axis of the scanning lens 121 in the main scanning direction is 75°. The incident angle β with respect to the reflective surface of the polygonal mirror 13 in the auxiliary scanning direction is 2.83° (=0.0494 radian).

TABLE 1 indicates a numerical structure of the scanning optical system 101 from a light incident side of the cylindrical lens 12 to the surface S. It should be noted that the numerical structure shown in TABLE 1 represents a structure with regard to a paraxial ray. Although an optical axis of a compensation lens 122 shifts from the optical axis of the scanning lens 21, in TABLE 1 a structure regarding a paraxial ray of the compensation lens 122 is indicated.

In TABLE 1, Ry denotes a radius (unit: mm) of curvature in the main scanning direction, Rz denotes a radius (unit: mm) of curvature in the auxiliary scanning direction (If a surface is rotationally symmetrical, no value is indicated). With regard to the radii of curvature Ry and Rz in TABLE 1, a minus sign is assigned when a center of the radius of curvature is positioned on the light source side with respect to an intersection point of the corresponding lens surface and the optical axis, and a plus sign is assigned when the center of the radius of curvature is positioned on the photoconductive drum side with respect to the intersection point.

Further, d denotes a distance (unit: mm) between adjacent surfaces on the optical axis, N denotes a refractive index at a design wavelength of 780 nm, and DECZ denotes a decentering amount (unit: mm) of each surface when the scanning optical system 110 is developed. DECZ is assigned a plus sign when the optical axis shifts toward an upper side in FIG. 5, and is assigned a minus sign when the optical axis shifts toward lower side in FIG. 5.

TABLE 1

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 54.00 | — | — |
| #4 | −184.70 | — | 10.00 | 1.48617 | — |
| #5 | −70.53 | −100.00 | 140.00 | — | — |
| #6 | −850.00 | — | 6.00 | 1.48617 | 9.00 |
| #7 | −1800.00 | — | 91.00 | — | — |
| #8 | ∞ | — | — | — | — | focal length = 235 mm,
scanning width = 216 mm
design wavelength = 780 nm
angle α = 75°,
angle β = 2.83°

In TABLE 1, surfaces #1 and #2 represents surfaces of the cylindrical lens 12, surface #3 is the reflective surface of the polygonal mirror 13, surfaces #4 and #5 represent the scanning lens 121, surfaces #6 and #7 represent the compensation lens 122. Surface #13 represents the surface S to be scanned.

As can be seen from TABLE 1, a front surface (#1) of the cylindrical lens 12 is a cylindrical surface, and a back surface (#2) of the cylindrical surface is a plane surface.

A back surface 121b of the scanning lens 121 (#5) is an anamorphic aspherical surface.

The anamorphic aspherical surface is defined by the following equations.

$$X(Y) = \frac{(1/Ry)Y^2}{1+\sqrt{1-(1+\kappa)^2 Y^2/Ry^2}} + AM_1 Y + AM_2 Y^2 + \quad (4)$$
$$AM_3 Y^3 + AM_4 Y^4 + AM_5 Y^5 + AM_6 Y^6 + AM_7 Y^7 + AM_8 Y^8 \ldots$$

$$1/Rz(Y) = 1/Rz + AS_1 Y + AS_2 Y^2 + AS_3 Y^3 + AS_4 Y^4 + AS_5 Y^5 + AS_6 Y^6 + AS_7 Y^7 + AS_8 Y^8 \quad (5)$$

where, X(Y) is a SAG amount which is obtained as a function of a coordinate Y extending in the main scanning direction. The SAG amount X(Y) represents a distance between a plane tangential to the anamorphic aspherical surface at the optical axis and a point on a curved line extending along the anamorphic aspherical surface in the main scanning direction and passing the optical axis thereof. Further, $1/R_Z(Y)$ represents a curvature of an arc extending in the auxiliary scanning direction, the arc is intersecting the curved line at the point whose coordinate is Y. $1/R_Z$ represents a curvature of the anamorphic aspherical surface in the auxiliary scanning direction at the optical axis. κ represents a conical coefficient, and $AM_n$ is an aspherical coefficient of $n^{th}$ order. $AS_n$ is an aspherical coefficient of $n^{th}$ order for determining the curvature in the auxiliary scanning direction.

Values of the coefficients $AM_n$ and $AS_n$ defining the back surface 121b (#5) of the scanning lens 121 of the first example are indicated in TABLE 2.

TABLE 2

| surface #5 (anamorphic aspherical surface) | |
|---|---|
| κ = 0.00E+00 | |
| $AM_1$ = 0.00E+00 | $AS_1$ = 8.16E−06 |
| $AM_2$ = 0.00E+00 | $AS_2$ = 5.73E−07 |

TABLE 2-continued surface #5 (anamorphic aspherical surface)
κ = 0.00E+00

| | |
|---|---|
| $AM_3$ = 0.00E+00 | $AS_3$ = −1.80E−08 |
| $AM_4$ = 1.24E−07 | $AS_4$ = −7.26E−09 |
| $AM_5$ = 0.00E+00 | $AS_5$ = 5.25E−11 |
| $AM_6$ = −9.74E−12 | $AS_6$ = 1.02E−11 |
| $AM_7$ = 0.00E+00 | $AS_7$ = −3.63E−14 |
| $AM_8$ = 6.78E−15 | $AS_8$ = −5.24E−15 |

A front surface 122a of the compensation lens 122 is an aspherical surface defined by a two-dimensional polynomial expression.

The aspherical surface defined by a two-dimensional polynomial expression is expressed by:

$$X(Y,Z) = \frac{(1/Ry)(Y^2+Z^2)}{1+\sqrt{1-(1+\kappa)(Y^2+Z^2)/Ry^2}} + \sum B_{mn}Y^mZ^n \quad (6)$$

where, X(Y,Z) is a SAG amount which is defined by coordinate axes corresponding to the main scanning direction (Y axis) and the auxiliary scanning direction (Z axis). X(Y,Z) is a distance between a point (Y,Z) on the aspherical surface and a plane tangential to the aspherical surface at a center position (an origin point) thereof. 1/Ry represents a curvature in the main scanning direction at the center position. κ represents a conical coefficient, $B_{mn}$ is an aspherical coefficient (m is an order as to the main scanning direction, n is an order as to the auxiliary scanning direction).

Values of the coefficients defining the front surface 122a (#6) of the compensation lens 122 are indicated in TABLE 3.

TABLE 3 surface #6

| $B_{mn}$ | n = 0 | n = 1 | n = 2 | n = 3 | n = 4 |
|---|---|---|---|---|---|
| m = 0 | — | 8.622E−02 | 1.589E−02 | −3.156E−06 | −1.767E−06 |
| m = 2 | 4.490E−06 | −7.494E−07 | −2.523E−07 | −3.649E−10 | −1.966E−10 |
| m = 4 | 5.456E−08 | −2.099E−10 | −3.131E−12 | 1.723E−14 | −3.394E−14 |
| m = 6 | 6.314E−13 | 2.856E−14 | 8.370E−16 | −1.216E−16 | 0.000E+00 |
| m = 8 | −1.455E−16 | −1.547E−18 | 0.000E+00 | 0.000E+00 | 0.000E+00 |

Values of coefficients of the first example defining the condition (3) are indicated below.

H=3.00 mm

β=0.0494 radian

D=−54.0 mm $R_{Z1}$=−184.70 mm

In this case, H/2 (=1.5)<2|βD(D−$R_{Z1}$)/$R_{Z1}$ (=3.78). Accordingly, the first example satisfies the condition (3).

Since the first example satisfies the condition (3), the undesired beam reflected from the front surface 121a of the scanning lens 121 does not impinge on the reflective surface of the polygonal mirror 13. Therefore, according to the first example, occurrence of a phenomenon in which the undesired beam proceeds toward the surface S passing through the scanning lens 121 after reflection from the reflective surface of the polygonal mirror 13 is prevented. Accordingly, occurrence of ghost images on the surface S to be scanned is prevented.

Further, according to the first example, the back surface 121b of the scanning lens 121 is formed to be the anamorphic aspherical surface, and the front surface 122a of the compensation lens 122 is formed to be the aspherical surface defined by the two-dimensional polynomial expression. Accordingly, it is possible to compensate for a bow which occurs if the beam-incident on the polygonal mirror is inclined with respect the main scanning plane.

Second Embodiment

A scanning optical system according to a second embodiment of the invention will be described. Since an arrangement of optical components of the second embodiment is substantially the same as the first embodiment, a configuration of the scanning optical system of the second embodiment is described with reference to FIGS. 1 and 2. The feature of the second embodiment is that both of the front surface 21a and the back surface 21b of the scanning lens 21 are configured to prevent occurrence of ghost images. A Detailed explanation of the components which do not relate to a configuration to prevent occurrence of ghost images is not repeated.

Next, the configuration to prevent occurrence of ghost images according to the second embodiment will be described with reference to FIG. 3. As shown in FIG. 3, each of the laser beams reflected by the reflective surface of the polygonal mirror 13 is obliquely incident on the scanning lens 21 in the auxiliary scanning direction. It is appreciated that by selecting appropriate values as to the distance D between the reflective surface of the polygonal mirror 13 and the scanning lens 21, the incident angle β which the beam impinging on the reflective surface of the polygonal mirror 13 forms with respect to the optical axis of the scanning lens 21 in the auxiliary scanning direction, and radii of curvature $R_{Z1}$ of the front surface 21a and −$R_{Z2}$ of the back surface 21b of the scanning lens 21, it is possible to direct undesired beams reflected from the surface 21a and the surface 21b to pass above the top surface of the polygonal mirror 13. That is, it is possible to direct the undesired beams so as not to impinge on the reflective surface of the polygonal mirror.

More specifically, the scanning optical system 10 according to the second embodiment is configured to satisfy a condition:

$$H/2 < 2\beta D(D-L_Z)/L_Z$$

$$L_Z = R_{Z1}R_{Z2}D/(2N R_{Z1}D - 2(N-1)R_{Z2}D - R_{Z1}R_{Z2}) \quad (7)$$

where all coefficients have the same meanings as the first embodiment. $R_{Z2}$ represents a radius of curvature of the back surface 21b of the scanning lens 21. N represents a refractive index of the scanning lens 21 at the design wavelength.

Hereafter, two concrete examples (a second example and a third example) which satisfy the above condition (7) will be described in detail.

SECOND EXAMPLE

Figure 6:
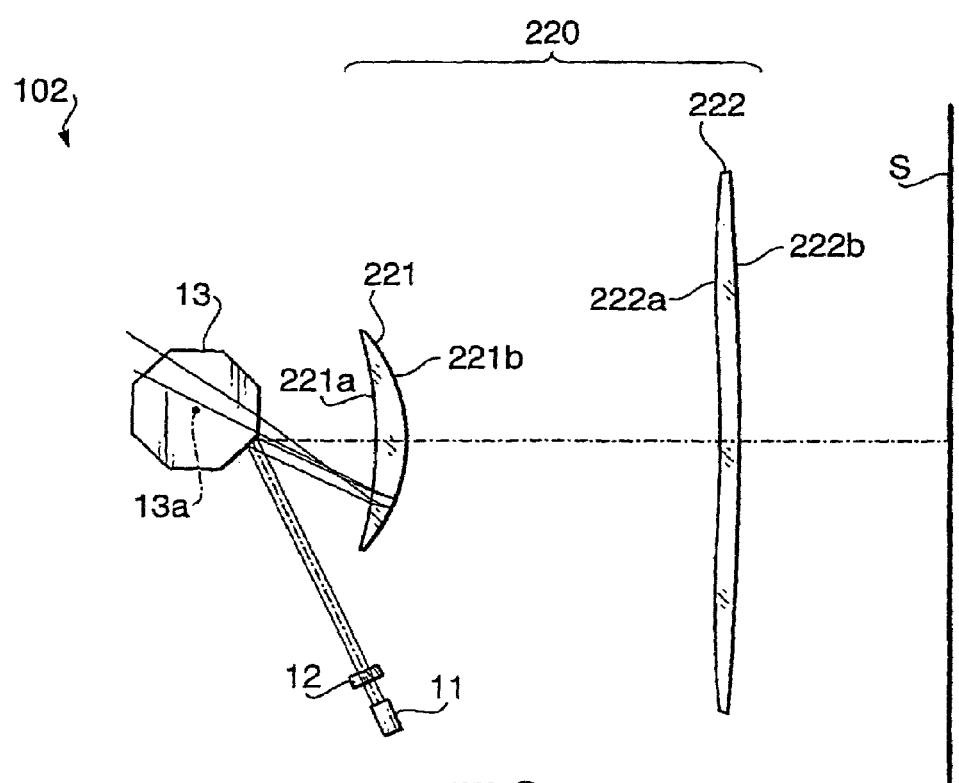
FIG. 6 is a developed view of a scanning optical system according to a second example viewed along the rotational axis of the polygonal mirror.
Figure 7:
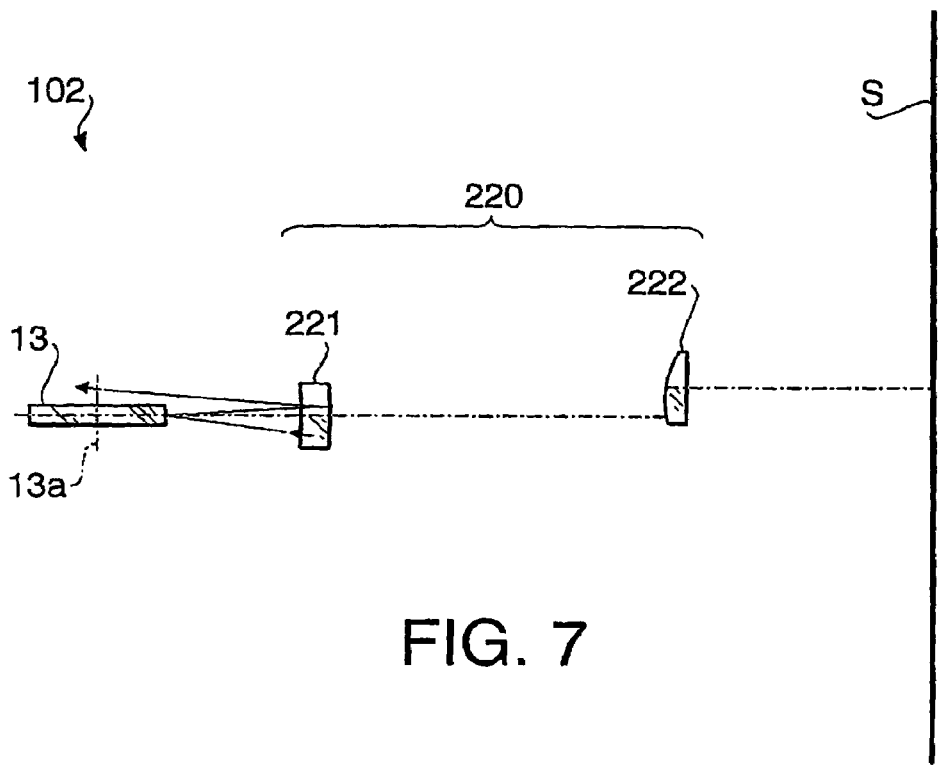
FIG. 7 is a developed view of the scanning optical system shown in FIG. 6 according to the second example view from a line parallel with the main scanning direction.

FIG. 6 is a developed view of a scanning optical system 102 according to the second example viewed along the rotational axis 13a of the polygonal mirror 13. FIG. 7 is a developed view of the scanning optical system 102 according to the second example view from a line parallel with the main scanning direction. It should be noted that in each of FIGS. 6 and 7, only optical paths of an undesired beam reflected from the back surface 221b of the scanning lens 221 is indicated and optical paths of normal beams which are not reflected by surfaces of the scanning lens 221 are omitted for the sake of simplicity.

In the second example, a total focal length of an fθ lens 220 is 200 mm, a scanning width is 216 mm, and a design wavelength is 780 nm. The thickness H of the polygonal mirror 13 is 4.0 mm, a deflection angle a which the beam impinging on the polygonal mirror 13 forms with respect to the optical axis of the scanning lens 221 in the main scanning direction is 65°. The incident angle β with respect to the reflective surface of the polygonal mirror 13 in the auxiliary scanning direction is 3.54° (=0.0617 radian).

TABLE 4 indicates a numerical structure of the scanning optical system 102 according to the second example from the light incident side of the cylindrical lens 12 to the photoconductive drum. Symbols in the TABLE 4 have the same meanings as those of the TABLE 1.

TABLE 4

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 45.42 | — | — |
| #4 | −185.60 | — | 10.00 | 1.48617 | — |
| #5 | −63.79 | −300.00 | 113.11 | — | — |
| #6 | −958.42 | — | 7.00 | 1.48617 | 11.00 |
| #7 | −1800.00 | — | 82.61 | — | — |
| #8 | ∞ | — | — | — | — | focal length = 200 mm,
scanning width = 216 mm
design wavelength = 780 nm
angle α = 65°,
angle β = 3.54°

As can be seen from TABLE 4, a front surface (#1) of the cylindrical lens 12 is a cylindrical surface, and a back surface (#2) of the cylindrical surface is a plane surface. The front surface 221a (#4) of the scanning lens 221 and the back surface 222b (#7) of the compensation lens 222 are rotationally symmetrical surfaces.

A back surface 221b of the scanning lens 221 (#5) is an anamorphic aspherical surface defined by the equations (4) and (5). Values of the coefficients $AM_n$ and $AS_n$ to define the back surface (#5) of the scanning lens 221 by the equations (4) and (5) are indicated in TABLE 5.

TABLE 5 surface #5 (anamorphic aspherical surface)
$\kappa = 0.00E+00$

| | |
|---|---|
| $AM_1 = 0.00E+00$ | $AS_1 = 8.56E-06$ |
| $AM_2 = 0.00E+00$ | $AS_2 = -1.82E-06$ |
| $AM_3 = 0.00E+00$ | $AS_3 = -3.44E-09$ |
| $AM_4 = 1.88E-07$ | $AS_4 = -9.08E-10$ |
| $AM_5 = 0.00E+00$ | $AS_5 = 4.12E-11$ |
| $AM_6 = -1.87E-12$ | $AS_6 = -3.91E-13$ |
| $AM_7 = 0.00E+00$ | $AS_7 = -3.33E-14$ |
| $AM_8 = 1.13E-15$ | $AS_8 = 0.00E+00$ |

The front surface 222a of the compensation lens 222 is an asperical surface defined by the two-dimensional polynomial expression (6). Values of the coefficients defining the front surface 222a (#6) of the compensation lens 222 by the equation (6) are indicated in TABLE 6.

TABLE 6 surface #6

| $B_{mn}$ | n = 0 | n = 1 | n = 2 | n = 3 | n = 4 |
|---|---|---|---|---|---|
| m = 0 | — | 1.367E−01 | 1.809E−02 | 5.971E−06 | −1.710E−06 |
| m = 2 | −8.984E−05 | −2.786E−06 | −4.458E−07 | −2.245E−09 | −1.799E−10 |
| m = 4 | 1.001E−07 | −2.397E−10 | 2.074E−12 | −3.682E−13 | −2.984E−14 |
| m = 6 | −3.700E−12 | 3.139E−14 | 1.141E−15 | −1.209E−16 | 0.000E+00 |
| m = 8 | 5.485E−17 | −1.525E−18 | 0.000E+00 | 0.000E+00 | 0.000E+00 |

Values of coefficients of the second example defining the condition (7) are indicated below.
H=4.00 mm
β=0.0617 radian
D=−45.42 mm
N=1.48617
$R_{Z1}$=−185.60 mm
$R_{Z2}$=−300 mm In this case, H/2 (=2.0)<2βD(D−$L_Z$)/$L_Z$ (=5.02). Accordingly, the second example satisfies the condition (7).

Rz shown in the TABLE 4 is the radius of curvature as to the laser beam which forms a beam spot at the image height Y=0. The scanning optical system 102 has to satisfy the condition (7) within entire range of image height. In the second example, the $R_{Z2}$ (the radius of curvature of the back surface 221b of the scanning lens 221) as to the beam which forms the beam spot at the image height Y=110 mm is −212.47 mm ($R_{Z2}$=−212.47 mm), and the $R_{Z1}$ (the radius of curvature of the front surface 221a of the scanning lens 221) is constant because the front surface 221a is a spherical surface.

Therefore, as to the laser beam which forms a beam spot at the image height Y=110 mm, H/2 (=2.0)<2βD(D−$L_Z$)/$L_Z$ (=4.49). Accordingly, the second example satisfies the condition (7) within entire range of the image height.

Since the second example satisfies the condition (7), the undesired beams reflected from the front surface 221a and the back surface 221b of the scanning lens 221 do not impinge on the reflective surface of the polygonal mirror 13. Therefore, according to the second example, occurrence of a phenomenon in which the undesired beams proceed toward the surface S passing through the fθ lens 220 after reflected from the reflective surface of the polygonal mirror 13 is prevented. Accordingly, occurrence of ghost images on the surface S to be scanned is prevented.

THIRD EXAMPLE

Figure 8:
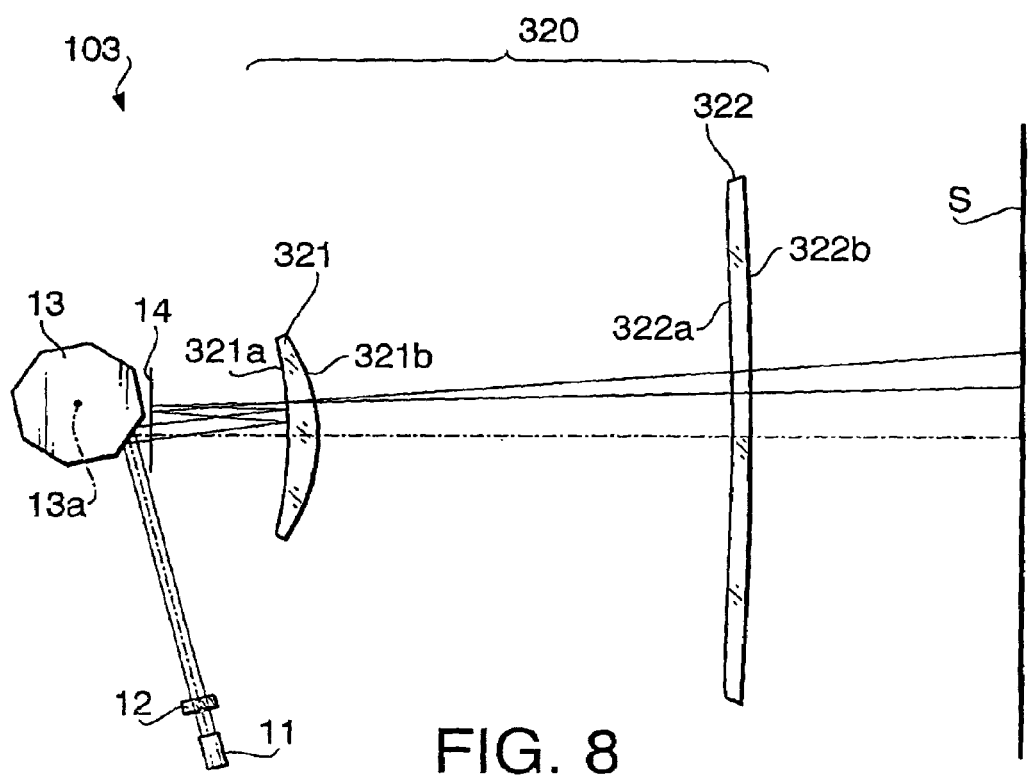
FIG. 8 is a developed view of a scanning optical system according to a third example viewed along the rotational axis of the polygonal mirror.
Figure 9:
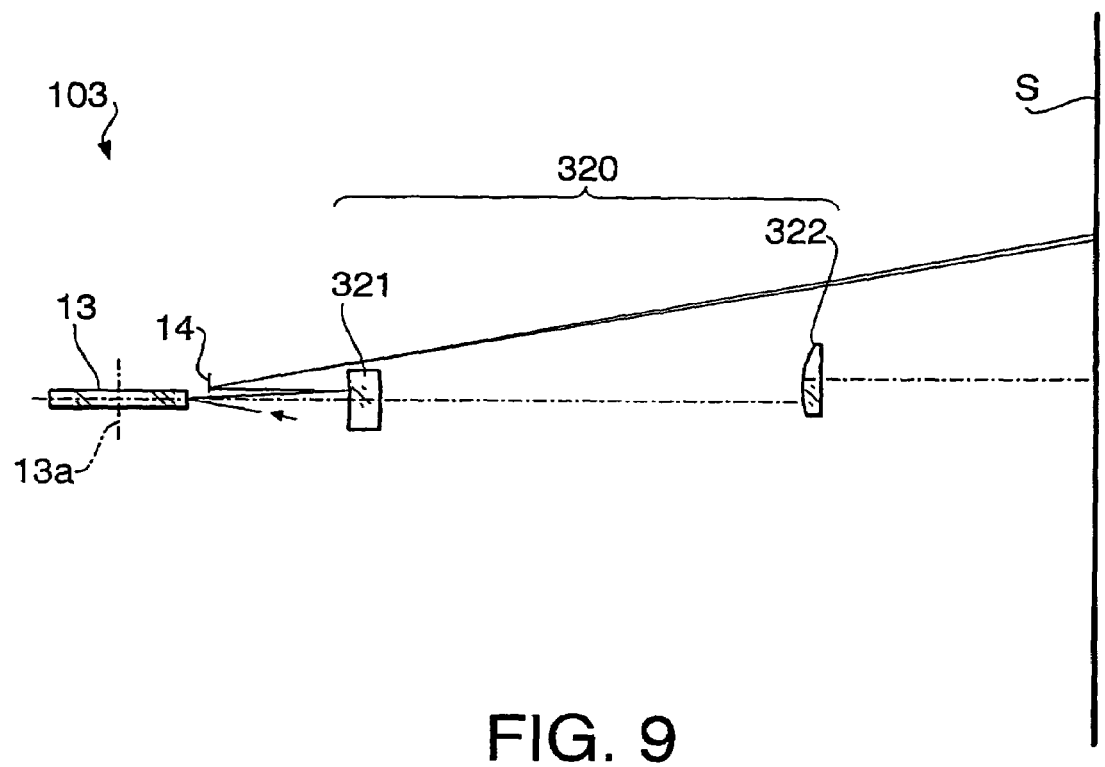
FIG. 9 is a developed view of the scanning optical system shown in FIG. 8 viewed from a line parallel with the main scanning direction.

FIG. 8 is a developed view of a scanning optical system 103 according to the third example viewed along the rotational axis 13a of the polygonal mirror 13. FIG. 9 is a developed view of the scanning optical system 103 viewed from a line parallel with the main scanning direction. It should be noted that in each of FIGS. 8 and 9, optical paths of normal beams which are not reflected by surfaces of the scanning lens 321 are omitted for the sake of simplicity.

In the third example, the total focal length of a fθ lens 320 is 200 mm, the scanning width is 216 mm, and the design wavelength is 780 nm. The thickness H of the polygonal mirror 13 is 4.0 mm, the deflection angle α is 65°. The incident angle β with respect to the reflective surface of the polygonal mirror 13 in the auxiliary scanning direction is 2.83° (=0.0494 radian).

TABLE 7 indicates a numerical structure of the scanning optical system 103 according to the third example from the light incident side of the cylindrical lens 12 to the photoconductive drum. Symbols in the TABLE 7 have the same meanings as those of the TABLE 1.

TABLE 7

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 45.00 | — | — |
| #4 | −185.60 | 158.78 | 10.00 | 1.48617 | — |
| #5 | −63.00 | −300.00 | 112.50 | — | — |
| #6 | −600.00 | — | 5.00 | 1.48617 | 7.00 |
| #7 | −1800.00 | — | 82.53 | — | — |
| #8 | ∞ | — | — | — | — | focal length = 200 mm,
scanning width = 216 mm
design wavelength = 780 nm
angle α = 65°,
angle β = 2.83°

As can be seen from TABLE 7, a front surface (#1) of the cylindrical lens 12 is a cylindrical surface, and a back surface (#2) of the cylindrical surface is a plane surface. A back surface 322b (#7) of the compensation lens 322 is a rotationally symmetrical surface.

A front surface (#4) of the scanning lens 321 is a toric aspherical surface. The toric aspherical surface is defined by the equation:

$$X(Z) = \frac{(1/Rz)Y^2}{1+\sqrt{1-(1+\kappa)^2 Y^2/Rz^2}} + AM_1 Y + AM_2 Y^2 + \qquad (8)$$

$$AM_3 Y^3 + AM_4 Y^4 + AM_5 Y^5 + AM_6 Y^6 + AM_7 Y^7 + AM_8 Y^8 \ldots$$

where 1/Rz represents a curvature of the toric aspherical surface in the auxiliary scanning direction at the optical axis, and $AM_n$ is an aspherical coefficient of $n^{th}$ order.

Values of the coefficient $AM_n$ defining the front surface 321a (#4) of the scanning lens 321 are as follows. The fourth order aspherical coefficient $AM_4$=6.15×10$^{-6}$, and other coefficients are all zero.

A back surface of the scanning lens 321 (#5) is an anamorphic aspherical surface defined by the equations (4) and (5). Values of the coefficients $AM_n$ and $AS_n$ to define the back surface 321b (#5) of the scanning lens 321 by the equations (4) and (5) are indicated in TABLE 8.

TABLE 8 surface #5 (anamorphic aspherical surface)
κ = 0.00E+00

| | |
|---|---|
| $AM_1$ = 0.00E+00 | $AS_1$ = 1.01E−05 |
| $AM_2$ = 0.00E+00 | $AS_2$ = 3.62E−06 |
| $AM_3$ = 0.00E+00 | $AS_3$ = 2.58E−08 |
| $AM_4$ = 2.57E−07 | $AS_4$ = −4.35E−09 |
| $AM_5$ = 0.00E+00 | $AS_5$ = −2.04E−11 |
| $AM_6$ = 6.15E−12 | $AS_6$ = 1.02E−12 |
| $AM_7$ = 0.00E+00 | $AS_7$ = 0.00E+00 |
| $AM_8$ = −7.02E−15 | $AS_8$ = 0.00E+00 |
| $AM_9$ = 0.00E+00 | $AS_9$ = 0.00E+00 |
| $AM_{10}$ = −2.51E−18 | $AS_{10}$ = 0.00E+00 |

The front surface 322a of the compensation lens 322 is an asperical surface defined by the two-dimensional polynomial expression (6). Values of the coefficients defining the front surface 322a (#6) of the compensation lens 322 by the equation (6) are indicated in TABLE 9.

TABLE 9

| | surface #6 | | | | |
|---|---|---|---|---|---|
| $B_{mn}$ | n = 0 | n = 1 | n = 2 | n = 3 | n = 4 |
| m = 0 | — | 8.309E−02 | 1.841E−02 | 1.100E−05 | −1.370E−06 |
| m = 2 | 9.415E−06 | −1.086E−06 | −4.587E−07 | −3.826E−09 | −1.378E−10 |
| m = 4 | 1.086E−07 | −2.907E−10 | 2.363E−12 | −5.060E−14 | −2.603E−14 |
| m = 6 | −3.922E−12 | 3.501E−14 | 9.319E−15 | −8.914E−17 | 0.000E+00 |
| m = 8 | 5.316E−17 | −1.728E−18 | 0.000E+00 | 0.000E+00 | 0.000E+00 |

Values of the coefficients of the third example defining the condition (7) are indicated below.

H=4.00 mm
β=0.0494 radian
D=−42.00 mm
$R_{Z1}$=−158.78 mm
$R_{Z2}$=−300 mm

In this case, H/2 (=2.0)<2βD(D−$L_Z$)/$L_Z$ (=2.75). Accordingly, the third example satisfies the condition (7).

In the third example, the $R_{Z2}$ (the radius of curvature of the back surface 321b of the scanning lens 321) as to the beam which forms the beam spot at the image height Y=110 mm is −316.13 mm ($R_{Z2}$=−316.13 mm), and the $R_{Z1}$ (the radius of curvature of the front surface 321a of the scanning lens 321) is constant.

Therefore, as to the laser beam which forms a beam spot at the image height Y=110 mm, H/2 (=2.0)<2βD(D−$L_Z$)/$L_Z$ (=2.80). Accordingly, the third example satisfies the condition (7) within entire range of the image height.

Since the third example satisfies the condition (7), the undesired beams reflected from the front surface 321a and the back surface 321b of the scanning lens 321 do not impinge on the reflective surface of the polygonal mirror 13. Therefore, according to the third example, occurrence of the phenomenon in which the undesired beams proceed toward the surface S after reflected from the polygonal mirror 13 is prevented. Accordingly, occurrence of ghost images on the surface S to be scanned is prevented.

In addition to the above mentioned configuration to prevent occurrence of the ghost images, the scanning optical system 103 according to the third example includes a shield member 14 which is located between the polygonal mirror 13 and the scanning lens 321. The optical path shown in FIGS. 8 and 9 corresponds to the undesired beam which is reflected by the shield member 14 after reflected by the scanning lens 321. As shown in FIGS. 8 and 9, the undesired beam reflected by the shield member 14 impinges on the surface S at a position sufficiently away from the position at which the normal beam impinges on the surface S. Accordingly, the undesired beam reflected by the shield member 14 does not make ghost images. By using the shield member 14, occurrence of the ghost images is prevented more reliably.

Third Embodiment

A scanning optical system according to a third embodiment of the invention will be described. Since an arrangement of optical components in the third embodiment is substantially the same as the first embodiment, a configuration of the scanning optical system of the third embodiment is described with reference to FIGS. 1 and 2. The feature of the third embodiment is that the undesired beam reflected from the front surface 21a of the scanning lens 21 passes below a bottom surface of the polygonal mirror 13 (see FIG. 10). A detailed explanation of the components which do not relate to a configuration for preventing occurrence of ghost images is not repeated.

Figure 10:
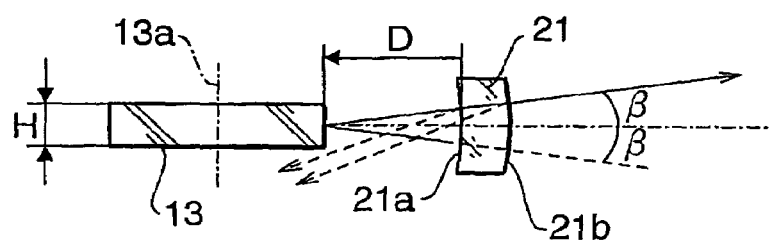
FIG. 10 is a side view of a scanning optical system according to a third embodiment illustrating optical paths of undesired beams.

Next, the configuration to prevent occurrence of ghost images according to the third embodiment will be described in detail with reference to FIG. 10. FIG. 10 is a side view of the scanning optical system according to the third embodiment illustrating optical paths of undesired beams. As shown in FIG. 10, the laser beam reflected by the reflective surface of the polygonal mirror 13 is obliquely incident on the scanning lens 21 in the auxiliary scanning direction. It is appreciated that by selecting appropriate values as to the distance D between the reflective surface of the polygonal mirror 13 and the scanning lens 21, the incident angle β which the beam impinging on the reflective surface of the polygonal mirror 13 forms with respect to the optical axis of the scanning lens 21 in the auxiliary scanning direction, and the radius of curvature $R_{Z1}$ of the front surface 21a of the scanning lens 21, it is possible to direct the undesired beam reflected from the surface 21a to pass below the bottom surface of the polygonal mirror 13. That is, it is possible to direct the undesired beam so as not to impinge on the reflective surface of the polygonal mirror.

More specifically, the scanning optical system 10 according to the third embodiment is configured to satisfy a condition:

$$H/2 < -2\beta D(D-R_{Z1})/R_{Z1} \qquad (9)$$

where all coefficients have the same meanings as the first embodiment.

Hereafter, a concrete example (a fourth example) which satisfies the above condition (9) will be described in detail.

FOURTH EXAMPLE

Figure 11:
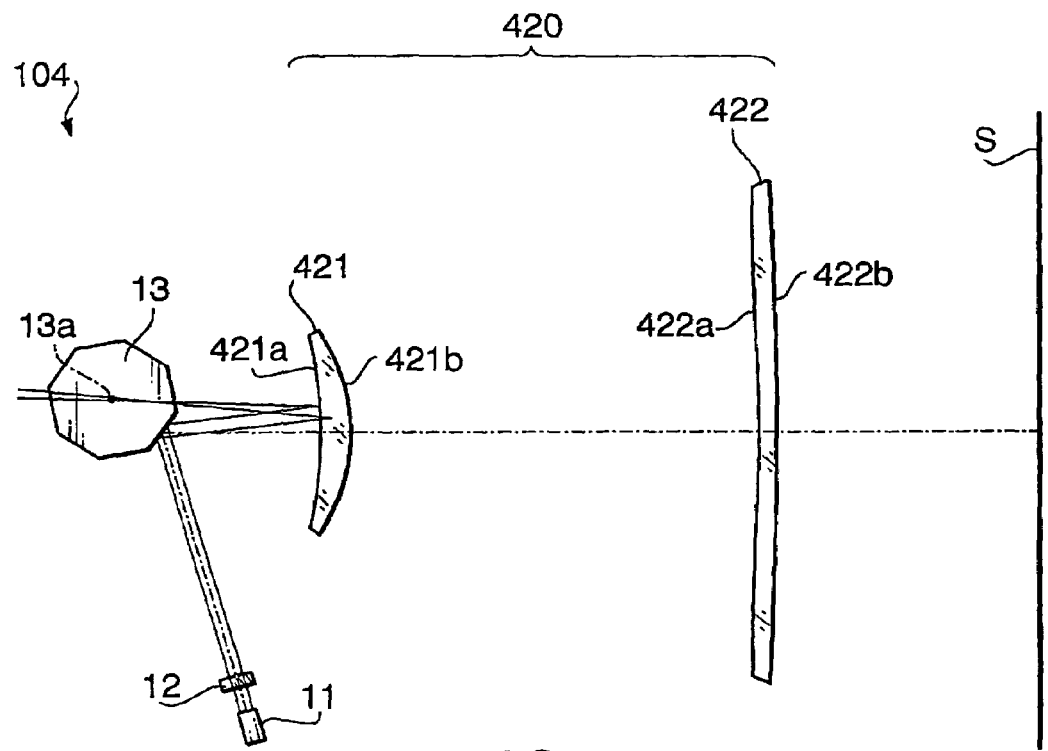
FIG. 11 is a developed view of a scanning optical system according to a fourth example viewed along the rotational axis of the polygonal mirror.
Figure 12:
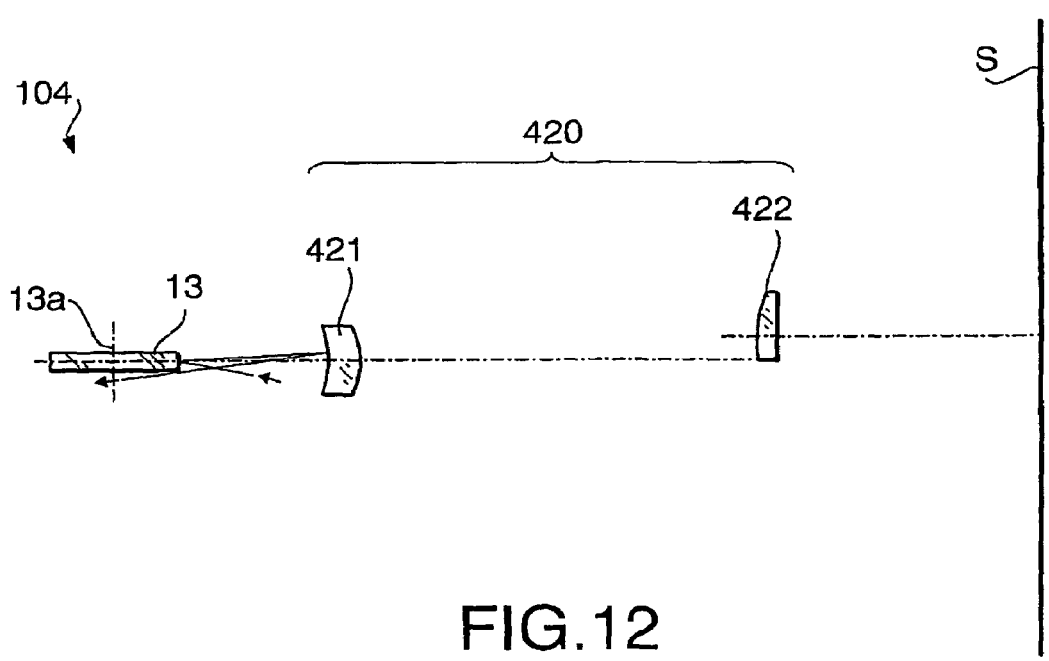
FIG. 12 is a developed view of the scanning optical system shown in FIG. 11 viewed from a line parallel with the main scanning direction.

FIG. 11 is a developed view of a scanning optical system 104 according to the fourth example viewed along the rotational axis 13a of the polygonal mirror 13. FIG. 12 is a developed view of the scanning optical system 104 viewed from a line parallel with the main scanning direction. It should be noted that in each of FIGS. 11 and 12, only an optical path of the undesired beam reflected from a surface 421a of the scanning lens 421 is indicated and optical paths of the normal beams which are not reflected by surfaces of the scanning lens 421 are omitted for the sake of simplicity.

In the fourth example, a total focal length of a fθ lens 420 is 235 mm, the scanning width is 216 mm, and the design wavelength is 780 nm. The thickness H of the polygonal mirror 13 is 3.0 mm, the deflection angle α is 65°. The incident angle β with respect to the reflective surface of the polygonal mirror 13 in the auxiliary scanning direction is 2.83° (=0.0494 radian).

TABLE 10 indicates a numerical structure of the scanning optical system 104 according to the fourth example from the light incident side of the cylindrical lens 12 to the photoconductive drum. Symbols shown in the TABLE 10 have the same meanings as those of the TABLE 1.

TABLE 10

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 54.00 | — | — |
| #4 | −207.44 | −30.00 | 10.00 | 1.48617 | — |
| #5 | −73.38 | −29.75 | 140.00 | — | — |
| #6 | −850.00 | — | 6.00 | 1.48617 | 8.00 |
| #7 | −1800.00 | — | 90.35 | — | — |
| #8 | ∞ | — | — | — | — | focal length = 235 mm,
scanning width = 216 mm
design wavelength = 780 nm
angle α = 65°,
angle β = 2.83°

As can be seen from TABLE 10, a front surface (#1) of the cylindrical lens 12 is the cylindrical surface, and the back surface (#2) of the cylindrical surface is a plane surface. A back surface 422b (#7) of the compensation lens 422 is a rotationally symmetrical surface.

The front surface 421a (#4) of the scanning lens 421 is an anamorphic aspherical surface defined by the equations (4) and (5). Values of the coefficients $AM_n$ and $AS_n$ to define the front surface (#4) of the scanning lens 421 by the equations (4) and (5) are indicated in TABLE 11.

TABLE 11

| surface #4 (anamorphic aspherical surface) |
| --- |
| $\kappa = 0.00E+00$ |

| | |
| --- | --- |
| $AM_1 = 0.00E+00$ | $AS_1 = -1.02E-05$ |
| $AM_2 = 0.00E+00$ | $AS_2 = 1.27E-06$ |
| $AM_3 = 0.00E+00$ | $AS_3 = 1.27E-08$ |
| $AM_4 = -1.75E-07$ | $AS_4 = 1.28E-08$ |
| $AM_5 = 0.00E+00$ | $AS_5 = -4.29E-11$ |
| $AM_6 = 8.39E-11$ | $AS_6 = -2.03E-11$ |
| $AM_7 = 0.00E+00$ | $AS_7 = 3.66E-14$ |
| $AM_8 = -2.76E-14$ | $AS_8 = 1.04E-14$ |

The back surface 421b (#5) of the scanning lens 421 is a toric aspherical surface defined by the equation (8). Values of the coefficient $AM_n$ defining the back surface (#5) of the scanning lens 421 according to the fourth example are as follows. The fourth order aspherical coefficient $AM_4 = -3.51 \times 10^{-5}$, the sixth order aspherical coefficient $AM_6 = -8.08 \times 10^{-5}$, and the other coefficients are all zero.

The front surface 422a of the compensation lens 422 is an aspherical surface defined by the two-dimensional polynomial expression (6). Values of the coefficients defining the front surface 422a (#6) of the compensation lens 422 by the equation (6) are indicated in TABLE 12.

TABLE 12

| | surface #6 | | | | |
| --- | --- | --- | --- | --- | --- |
| $B_{mn}$ | n = 0 | n = 1 | n = 2 | n = 3 | n = 4 |
| m = 0 | — | 7.157E-02 | 1.541E-02 | -2.014E-05 | -1.939E-06 |
| m = 2 | -1.197E-05 | -1.690E-07 | -2.040E-07 | 5.072E-10 | -2.385E-10 |
| m = 4 | 5.515E-08 | -2.166E-10 | -7.768E-12 | 1.287E-13 | -3.723E-14 |
| m = 6 | -3.485E-14 | 2.623E-14 | 1.518E-15 | -1.686E-16 | 0.000E+00 |
| m = 8 | -8.796E-17 | -1.270E-18 | 0.000E+00 | 0.000E+00 | 0.000E+00 |

Values of coefficients of the fourth example defining the condition (9) are indicated below.
H=3.00 mm
β=0.0494 radian
D=−54.00 mm
$R_{Z1}$=−30.0 mm In this case, H/2 (=1.5)<−2βD(D−$R_{Z1}$)/$R_{Z1}$ (−4.27). Accordingly, the fourth example satisfies the condition (9).

In the fourth example, the $R_{Z1}$ the radius of curvature of the front surface 421a of the scanning lens 421) as to the beam which forms the beam spot at the image height Y=110 mm is −36.47 mm ($R_{Z1}$=−36.47 mm). Therefore, as to the laser beam which forms the beam spot at the image height Y=110 mm, H/2 (=1.5)<−2D(D−$R_{Z1}$)/$R_{Z1}$ (=2.56). Accordingly, the fourth example satisfies the condition (9) within entire range of the image height.

Since the fourth example satisfies the condition (9), the undesired beam reflected from the front surface 421a of the scanning lens 421 does not impinge on the reflective surface of the polygonal mirror 13. Therefore, according to the fourth example, occurrence of the phenomenon in which the undesired beam proceeds toward the surface S after reflected from the polygonal mirror 13 is prevented. Accordingly, occurrence of ghost images on the surface S is prevented.

Fourth Embodiment

A scanning optical system according to a fourth embodiment of the invention will be described. Since an arrangement of optical components of the fourth embodiment is substantially the same as the first embodiment, a configuration of the scanning optical system of the fourth embodiment is described with reference to FIGS. 1 and 2. The feature of the fourth embodiment is that both of the front surface 21a and the back surface 21b of the scanning lens 21 are configured to prevent occurrence of ghost images. A Detailed explanation of the components which do not relate to a configuration to prevent occurrence of ghost images is not repeated.

Next, the configuration to prevent occurrence of ghost images according to the fourth embodiment will be described in detail with reference to FIG. 10. As shown in FIG. 10, the laser beam reflected by the reflective surface of the polygonal mirror 13 is obliquely incident on the scanning lens 21 in the auxiliary scanning direction. It is appreciated that by selecting appropriate values as to the distance D between the reflective surface of the polygonal mirror 13 and the scanning lens 21, the incident angle β which the beam impinging on the reflective surface of the polygonal mirror 13 forms with respect to the optical axis of the scanning lens 21 in the auxiliary scanning direction, and radii of curvature $R_{Z1}$ of the front surface 21a and $R_{Z2}$ of the back surface 21b of the scanning lens 21, it is possible to direct both of the undesired beams reflected from the surface 21a and the surface 21b to pass below the bottom surface of the polygonal mirror 13. That is, it is possible to direct the undesired beams so as not to impinge on the reflective surface of the polygonal mirror 13.

More specifically, the scanning optical system 10 according to the fourth embodiment is configured to satisfy a condition:

$$H/2 < -2\beta D(D-L_Z)/L_Z$$

$$L_Z = R_{Z1}R_{Z2}D/(2NR_{Z1}D - 2(N-1)R_{Z2}D - R_{Z1}R_{Z2}) \quad (10)$$

where all coefficients have the same meanings as those of the condition (7).

Hereafter, a concrete example (a fifth example) which satisfies the above condition (10) will be described in detail.

FIFTH EXAMPLE

Figure 13:
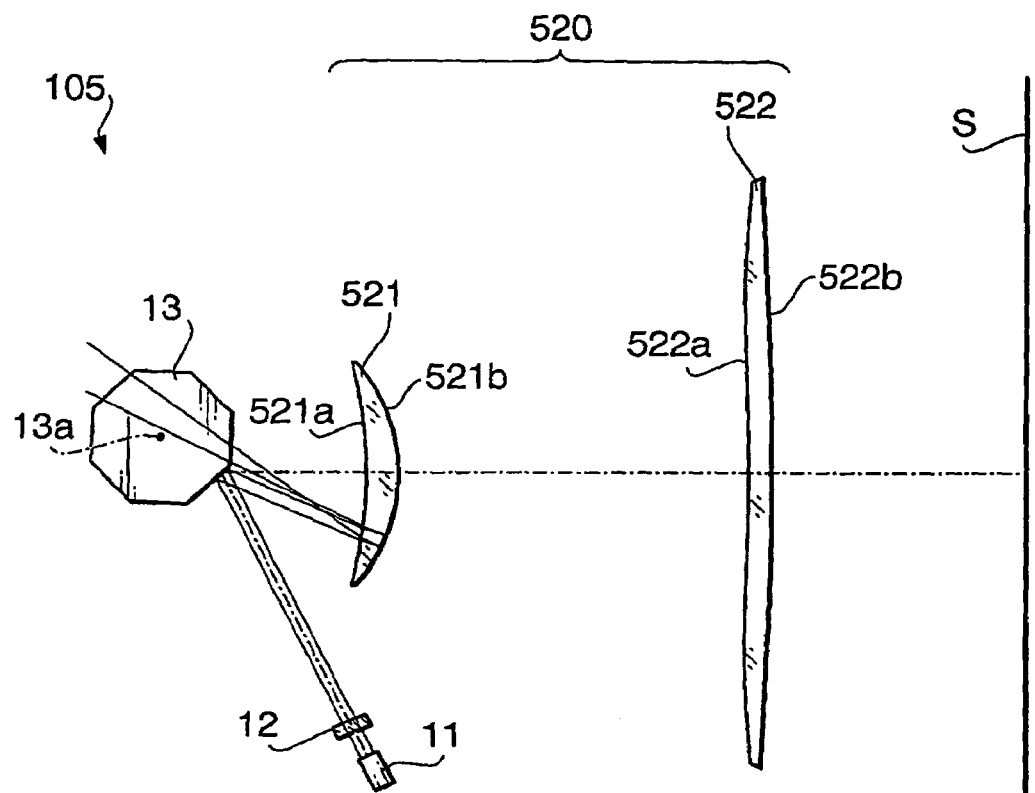
FIG. 13 is a developed view of a scanning optical system according to a fifth example viewed along the rotational axis of the polygonal mirror.
Figure 14:
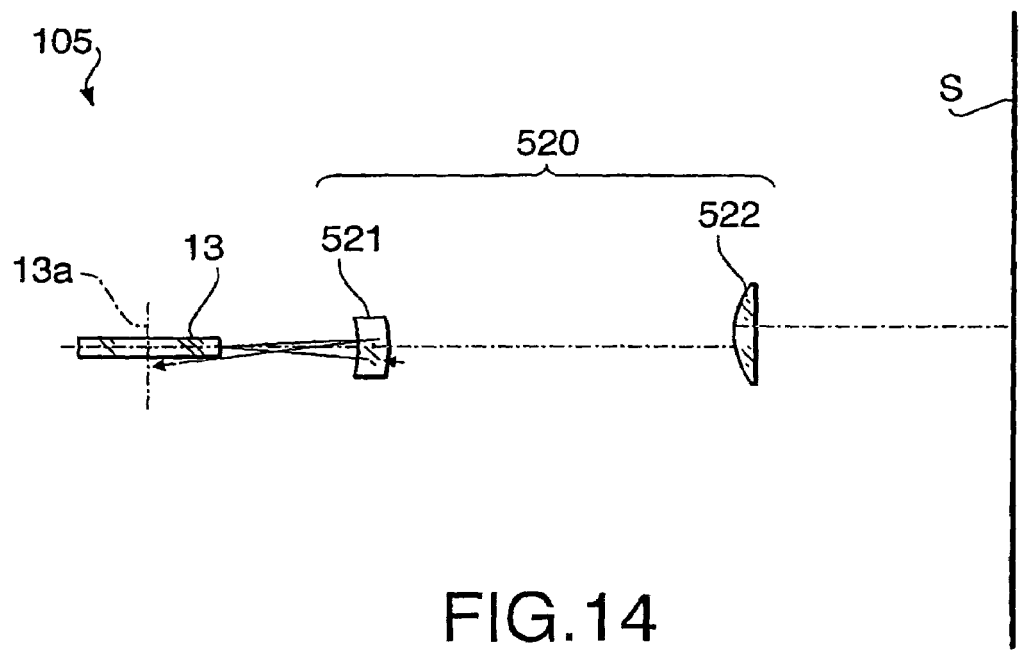
FIG. 14 is a developed view of the scanning optical system shown in FIG. 13 viewed from a line parallel with the main scanning direction.

FIG. 13 is a developed view of a scanning optical system 105 according to the fifth example viewed along the rotational axis 13a of the polygonal mirror 13. FIG. 14 is a developed view of the scanning optical system 105 viewed from a line parallel with the main scanning direction. It should be noted that in each of FIGS. 13 and 14, only an optical path of the undesired beam reflected from a surface 521b of a scanning lens 521 is indicated, and optical paths of normal beams which are not reflected by surfaces of the scanning lens 521 are omitted for the sake of simplicity.

In the fifth example, the total focal length of a fθ lens 520 is 200 mm, the scanning width is 216 mm, and the design wavelength is 780 nm. The thickness H of the polygonal mirror 13 is 3.0 mm, the deflection angle α is 65°. The incident angle β with respect to the reflective surface of the polygonal mirror 13 in the auxiliary scanning direction is 3.83° (=0.0494 radian).

TABLE 13 indicates a numerical structure of the scanning optical system 105 according to the fifth example from the light incident side of the cylindrical lens 12 to the surface S. Symbols in the TABLE 13 have the same meanings as those of the TABLE 1.

TABLE 13

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 42.00 | — | — |
| #4 | −185.60 | −42.09 | 10.00 | 1.48617 | — |
| #5 | −63.00 | −35.00 | 112.5 | — | — |
| #6 | −600.00 | — | 5.00 | 1.48617 | 7.00 |
| #7 | −1800.00 | — | 82.53 | — | — |
| #8 | ∞ | — | — | — | — | focal length = 200 mm,
scanning width = 216 mm
design wavelength = 780 nm
angle α = 65°,
angle β = 3.83°

As can be seen from TABLE 13, the front surface (#1) of the cylindrical lens 12 is a cylindrical surface, and the back surface (#2) of the cylindrical surface is a plane surface. A back surface 522b (#7) of the compensation lens 522 is a rotationally symmetrical surface. The front surface (#4) of the scanning lens 521 is a toric surface.

The back surface of the scanning lens 521 (#5) is an anamorphic aspherical surface defined by the equations (4) and (5). Values of the coefficients $AM_n$ and $AS_n$ to define the back surface (#5) of the scanning lens 21 by the equations (4) and (5) are indicated in TABLE 14.

TABLE 14 surface #5 (anamorphic aspherical surface)
κ = 0.00E+00

| | |
|---|---|
| $AM_1$ = 0.00E+00 | $AS_1$ = 9.13E−06 |
| $AM_2$ = 0.00E+00 | $AS_2$ = −3.08E−06 |
| $AM_3$ = 0.00E+00 | $AS_3$ = 1.52E−08 |
| $AM_4$ = 2.22E−07 | $AS_4$ = −7.84E−09 |
| $AM_5$ = 0.00E+00 | $AS_5$ = −8.62E−12 |
| $AM_6$ = −4.09E−12 | $AS_6$ = −3.08E−12 |
| $AM_7$ = 0.00E+00 | $AS_7$ = 0.00E+00 |
| $AM_8$ = −6.11E−15 | $AS_8$ = 0.00E+00 |
| $AM_9$ = 0.00E+00 | $AS_9$ = 0.00E+00 |
| $AM_{10}$ = 2.89E−18 | $AS_{10}$ = 0.00E+00 |

The front surface 522a of the compensation lens 522 is an aspherical surface defined by the two-dimensional polynomial expression (6). Values of the coefficients defining the front surface 522a (#6) of the compensation lens 522 by the equation (6) are indicated in TABLE 15.

TABLE 15 surface #6

| Bmn | n = 0 | n = 1 | n = 2 | n = 3 | n = 4 |
|---|---|---|---|---|---|
| m = 0 | — | 7.959E−02 | 1.817E−02 | 1.527E−05 | −1.384E−06 |
| m = 2 | 3.115E−06 | −6.728E−07 | −4.277E−07 | −5.186E−09 | −1.394E−10 |
| m = 4 | 1.133E−07 | −3.366E−10 | −6.468E−13 | −4.109E−14 | −2.625E−14 |
| m = 6 | −4.778E−12 | 3.902E−14 | 1.295E−15 | −9.152E−17 | 0.000E+00 |
| m = 8 | 1.088E−16 | −1.614E−18 | 0.000E+00 | 0.000E+00 | 0.000E+00 |

Values of coefficients of the fifth example defining the condition (10) are indicated below.

H=3.00 mm
β=0.0494 radian
D=−42.00 mm
N=1.48617
$R_{Z1}$=−42.9 mm
$R_{Z2}$=−35.00 mm In this case, H/2 (=1.5)<−2βD(D−$L_Z$)/$L_Z$ (=1.68). Accordingly, the fifth example satisfies the condition (10).

In the fifth example, the $R_{Z2}$ (the radius of curvature of the back surface 521b of the scanning lens 521) as to the beam which forms the beam spot at the image height Y=110 mm is −33.00 mm ($R_{Z2}$=−33.00 mm). Therefore, as to the laser beam which forms the beam spot at the image height Y=110 mm, H/2 (=1.5)<−2βD(D−$L_Z$)/$L_Z$ (=2.27). Accordingly, the fifth example satisfies the condition (10) within entire range of the image height.

Since the fifth example satisfies the condition (10), the undesired beams reflected from the front surface 521a and the back surface 521b of the scanning lens 521 do not impinge on the reflective surface of the polygonal mirror 13. Therefore, according to the fifth example, occurrence of the phenomenon in which the undesired beams proceed toward the surface S after reflected from the polygonal mirror 13 is prevented. Accordingly, occurrence of ghost images on the surface S is prevented.

In order to clarify advantages of the above mentioned first through fifth embodiments of the invention, hereafter, two comparison examples which do not satisfy the conditions (1) and (2) will be described.

$$H/2 < |2\beta D(D-R_{Z1})/R_{Z1}| \qquad (1)$$

$$H/2 < |2\beta D(D-L_Z)/L_Z| \qquad (2)$$

It should be noted that the condition (1) corresponds to a combination of the conditions (3) and (9), and that the condition (2) corresponds to a combination of the conditions (7) and (10).

FIRST COMPARISON EXAMPLE

Figure 15:
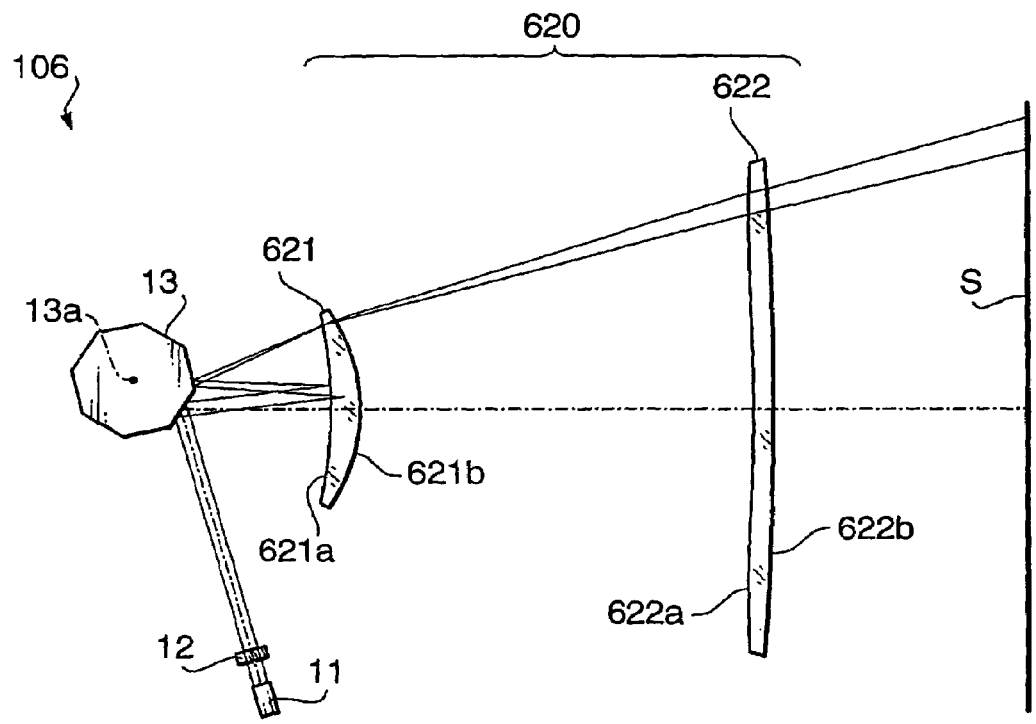
FIG. 15 is a developed view of a scanning optical system according to a first comparison example viewed along the rotational axis of the polygonal mirror.
Figure 16:
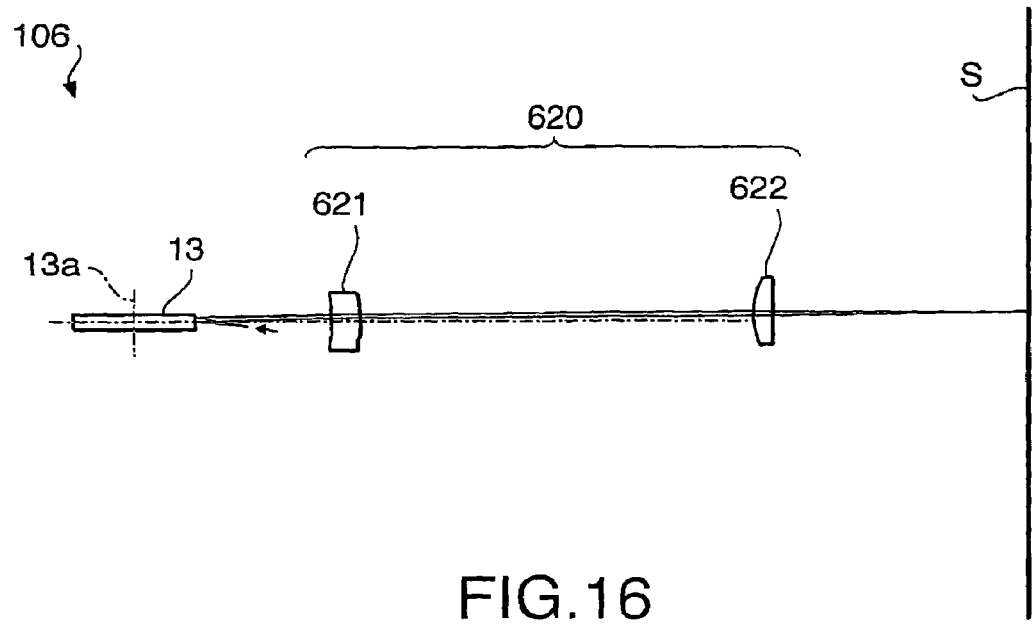
FIG. 16 is a developed view of the scanning optical system shown in FIG. 15 viewed from a line parallel with the main scanning direction.

FIG. 15 is a developed view of a scanning optical system 106 according to a first comparison example viewed along the rotational axis 13a of the polygonal mirror 13. FIG. 16 is a developed view of the scanning optical system 106 viewed from a line parallel with the main scanning direction. It should be noted that in each of FIGS. 15 and 16, only an optical path of the undesired beam reflected from a surface 621a of a scanning lens 621 is indicated and optical paths of the normal beams which are not reflected by surfaces of the scanning lens 621 are omitted for the sake of simplicity.

In the first comparison example, the total focal length of a fθ lens 620 is 235 mm, the scanning width is 216 mm, and the design wavelength is 780 nm. The thickness H of the polygonal mirror 13 is 3.0 mm, the deflection angle α is 65°.

The front surface 622a of the compensation lens 622 is an aspherical surface defined by the two-dimensional polynomial expression (6). Values of the coefficients defining the front surface 622a (#6) of the compensation lens 622 by the equation (6) are indicated in TABLE 18.

TABLE 18

| | surface #6 | | | | |
|---|---|---|---|---|---|
| $B_{mn}$ | n = 0 | n = 1 | n = 2 | n = 3 | n = 4 |
| m = 0 | — | 2.899E−02 | 1.598E−02 | 1.519E−05 | −1.041E−06 |
| m = 2 | 2.367E−05 | −2.543E−07 | −2.568E−07 | −1.037E−10 | −1.323E−10 |
| m = 4 | 6.795E−08 | −7.351E−11 | −3.067E−12 | −3.704E−13 | −2.604E−14 |
| m = 6 | −2.184E−12 | 1.035E−14 | 8.116E−16 | −1.143E−17 | 0.000E+00 |
| m = 8 | 4.790E−17 | −5.730E−19 | 0.000E+00 | 0.000E+00 | 0.000E+00 |

The incident angle β with respect to the reflective surface of the polygonal mirror 13 in the auxiliary scanning direction is 0.95° (=0.0166 radian).

TABLE 16 indicates a numerical structure of the scanning optical system 10 according to the first comparison example from the light incident side of the cylindrical lens 12 to the surface S. Symbols shown in the TABLE 16 have the same meanings as those of the TABLE 1.

TABLE 16

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 54.00 | — | — |
| #4 | −184.70 | — | 10.00 | 1.48617 | — |
| #5 | −70.53 | −100.00 | 140.00 | — | — |
| #6 | −817.63 | — | 6.00 | 1.48617 | 3.00 |
| #7 | −1800.00 | — | 91.20 | — | — |
| #8 | ∞ | — | — | — | — | focal length = 235 mm,
scanning width = 216 mm
design wavelength = 780 nm
angle α = 75°,
angle β = 0.95°

As can be seen from TABLE 16, the front surface (#1) of the cylindrical lens 12 is a cylindrical surface, and the back surface (#2) of the cylindrical surface is a plane surface. The front surface (#4) of the scanning lens 621 and the back surface 622b (#7) of the compensation lens 622 are rotationally symmetrical surfaces.

The back surface 621b (#5) of the scanning lens 621 is an anamorphic aspherical surface defined by the equations (4) and (5). Values of the coefficients $AM_n$ and $AS_n$ to define the back surface (#5) of the scanning lens 621 by the equations (4) and (5) are indicated in TABLE 17.

TABLE 17

| surface #5 (anamorphic aspherical surface) | |
|---|---|
| κ = 0.00E+00 | |
| $AM_1$ = 0.00E+00 | $AS_1$ = 8.16E−06 |
| $AM_2$ = 0.00E+00 | $AS_2$ = 5.73E−07 |
| $AM_3$ = 0.00E+00 | $AS_3$ = −1.80E−08 |
| $AM_4$ = 1.24E−07 | $AS_4$ = −7.26E−09 |
| $AM_5$ = 0.00E+00 | $AS_5$ = 5.25E−11 |
| $AM_6$ = −9.74E−12 | $AS_6$ = 1.02E−11 |
| $AM_7$ = 0.00E+00 | $AS_7$ = −3.63E−14 |
| $AM_8$ = 6.78E−15 | $AS_8$ = −5.24E−15 |

Values of coefficients of the first comparison example defining the condition (1) are indicated below.

H=3.00 mm

β=0.0166 radian

D=−54.00 mm $R_{Z1}$=−184.70 mm

In this case, H/2 (=1.5)>|2βD(D−$R_{Z1}$)/$R_{Z1}$| (=1.27). Accordingly, the first comparison example does not satisfy the condition (1).

Since the first comparison example does not satisfies the condition (1), the undesired beam reflected from the front surface 621a of the scanning lens 621 impinges on the polygonal mirror 13, and is reflected by the polygonal mirror 13, and then passes through the fθ lens 620 (see FIGS. 15 and 16). Consequently, the undesired beam makes ghost images on the surface S.

SECOND COMPARISON EXAMPLE

Figure 17:
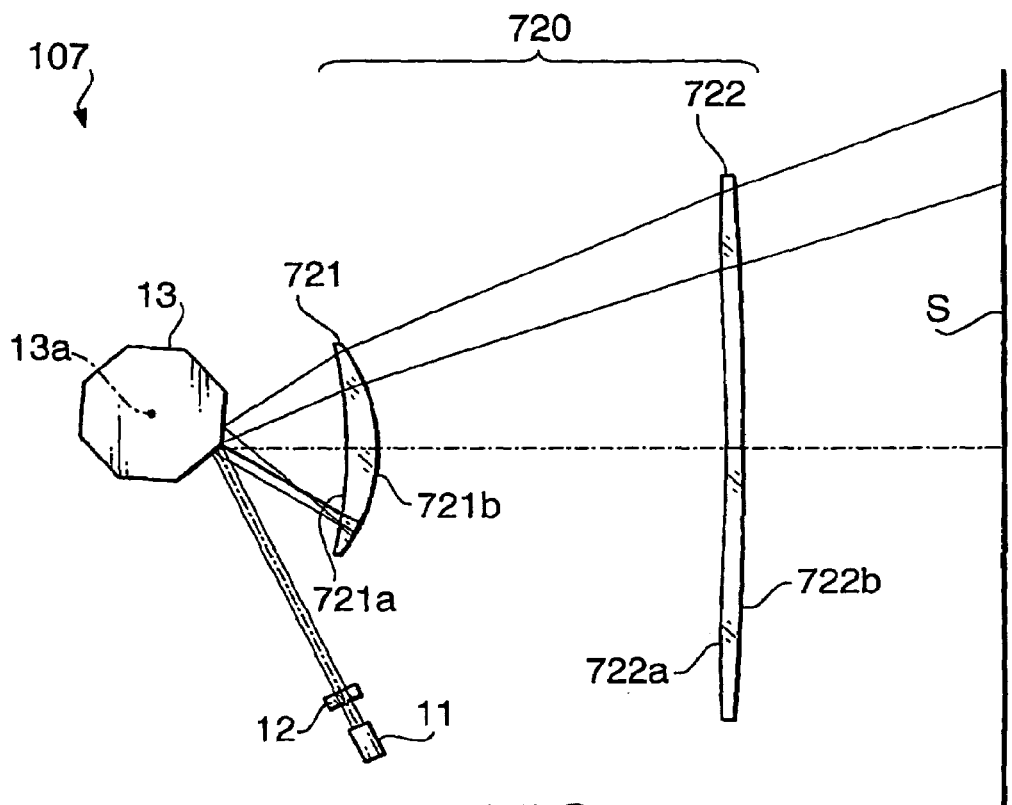
FIG. 17 is a developed view of a scanning optical system according to a second comparison example viewed along the rotational axis of the polygonal mirror.
Figure 18:
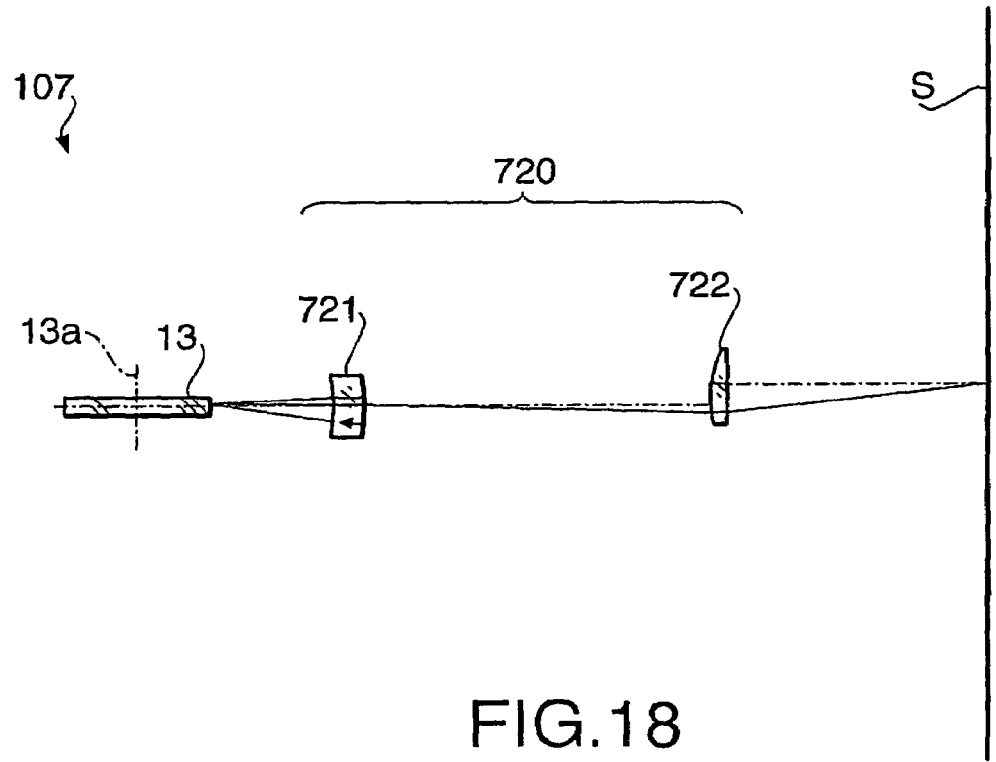
FIG. 18 is a developed view of the scanning optical system shown in FIG. 17 viewed from a line parallel with the main scanning direction.

FIG. 17 is a developed view of a scanning optical system 107 according to a second comparison example viewed along the rotational axis 13a of the polygonal mirror 13. FIG. 18 is a developed view of the scanning optical system 107 viewed from a line parallel with the main scanning direction. It should be noted that in each of FIGS. 17 and 18, only an optical path of the undesired beam reflected from a back surface 721b of a scanning lens 721 is indicated and optical paths of the normal beams which are not reflected by the surfaces of the scanning lens 721 are omitted for the sake of simplicity.

In the second comparison example, the total focal length of a fθ lens 720 is 200 mm, the scanning width is 216 mm, and the design wavelength is 780 nm. The thickness H of the polygonal mirror 13 is 4.0 mm, the deflection angle α is 65°. The incident angle β with respect to the reflective surface of the polygonal mirror 13 in the auxiliary scanning direction is 2.83° (=0.0494 radian).

TABLE 19 indicates a numerical structure of the scanning optical system 107 according to the second comparison example from the light incident side of the cylindrical lens 12 to the surface S. Symbols shown in the TABLE 19 have the same meanings as those of the TABLE 1.

TABLE 19

| Surface | Ry | Rz | d | N(780 nm) | DECZ |
|---|---|---|---|---|---|
| #1 | ∞ | +51.08 | 4.00 | 1.51072 | — |
| #2 | ∞ | — | 97.00 | — | — |
| #3 | ∞ | — | 42.00 | — | — |
| #4 | −185.60 | — | 10.00 | 1.48617 | — |
| #5 | −63.00 | −100.00 | 112.50 | — | — |
| #6 | −600.00 | — | 5.00 | 1.48617 | 7.00 |
| #7 | −1800.00 | — | 82.53 | — | — |
| #8 | ∞ | — | — | — | — | focal length = 200 mm,
scanning width = 216 mm
design wavelength = 780 nm
angle α = 65°,
angle β = 2.83°

As can be seen from TABLE 19, the front surface (#1) of the cylindrical lens 12 is a cylindrical surface, and the back surface (#2) of the cylindrical surface is a plane surface. The front surface 721a (#4) of the scanning lens 721 and a back surface 722b (#7) of a compensation lens 722 are rotationally symmetrical surfaces.

The back surface (#5) of the scanning lens 721 is an anamorphic aspherical surface defined by the equations (4) and (5). Values of the coefficients $AM_n$ and $AS_n$ to define the back surface (#5) of the scanning lens 721 by the equations (4) and (5) are indicated in TABLE 20.

TABLE 20 surface #5 (anamorphic aspherical surface)
κ = 0.00E+00

| | |
|---|---|
| $AM_1$ = 0.00E+00 | $AS_1$ = 1.11E−05 |
| $AM_2$ = 0.00E+00 | $AS_2$ = 2.23E−06 |
| $AM_3$ = 0.00E+00 | $AS_3$ = 1.89E−08 |
| $AM_4$ = 2.19E−07 | $AS_4$ = −8.32E−09 |
| $AM_5$ = 0.00E+00 | $AS_5$ = −1.51E−11 |
| $AM_6$ = −1.92E−12 | $AS_6$ = 2.49E−11 |
| $AM_7$ = 0.00E+00 | $AS_7$ = 0.00E+00 |
| $AM_8$ = 1.38E−15 | $AS_8$ = 0.00E+00 |
| $AM_9$ = 0.00E+00 | $AS_9$ = 0.00E+00 |
| $AM_{10}$ = −3.29E−18 | $AS_{10}$ = 0.00E+00 |

The front surface 722a of the compensation lens 722 is an aspherical surface defined by the two-dimensional polynomial expression (6). Values of the coefficients defining the front surface 722a (#6) of the compensation lens 722 by the equation (6) are indicated in TABLE 21.

TABLE 21

| $B_{mn}$ | n = 0 | n = 1 | n = 2 | n = 3 | n = 4 |
|---|---|---|---|---|---|
| m = 0 | — | 8.484E−02 | 1.853E−02 | 1.100E−05 | −1.370E−06 |
| m = 2 | 1.018E−05 | −9.633E−07 | −4.347E−07 | −3.826E−09 | −1.378E−10 |
| m = 4 | 1.095E−07 | −3.323E−10 | −2.867E−12 | −5.060E−14 | −2.603E−14 |
| m = 6 | −3.913E−12 | 3.286E−14 | 1.368E−15 | −8.914E−17 | 0.000E+00 |
| m = 8 | 3.966E−17 | −9.911E−19 | 0.000E+00 | 0.000E+00 | 0.000E+00 | values of coefficients of the second comparison example defining the condition (2) are indicated below.
H=4.00 mm
β=0.0494 radian
D=−42.00 mm
N=1.48617
$R_{Z1}$=−185.60 mm
$R_{Z2}$=−100.00 mm In this case, H/2 (=2.0)<|2βD(D−$L_Z$)/$L_Z$|(=2.02). Accordingly, the second comparison example satisfies the condition (2). However, the value −100.00 mm of the $R_{Z2}$ is a radius of curvature at the image height Y=0 (i.e., at the optical axis of the scanning lens 721).

In the second comparison example, the $R_{Z2}$ (the radius of curvature of the back surface 721b of the scanning lens 721) as to the beam which forms the beam spot at the image height Y=110 mm is −79.86 mm ($R_{Z2}$=−79.86 mm). Therefore, as to the image height Y=110 mm, H/2 (=2.0)>|2βD (D−$L_Z$)/$L_{Z1}$ (=1.36). Accordingly, the second comparison example does not satisfy the condition (2).

Since the second comparison example does not satisfy the condition (2), the undesired beam reflected from the back surface 721b of the scanning lens 721 impinges on the polygonal mirror 13, and is reflected by the polygonal mirror 13, and then passes through the fθ lens 720 (see FIGS. 17 and 18). Consequently, the undesired beam makes ghost images on the surface S.

As described above, according to the embodiments of the invention, occurrence of the ghost images is prevented. There is no necessity to employ imaging lenses having antireflective coatings to prevent occurrence of the ghost images. Further, according to the embodiments of the invention, an imaging lens made of plastic can be employed. Accordingly, manufacturing cost of the scanning optical system can be reduced.

The present disclosure relates to the subject matter contained in Japanese Patent Application No. P2002-214380, filed on Jul. 23, 2002, which is expressly incorporated herein by reference in its entirety.

What is claimed is:

1. A scanning optical system for emitting at least one beam scanning in a main scanning direction, comprising:

a light source that emits the at least one beam;

a polygonal mirror that rotates and deflects the at least one beam to scan in the main scanning direction; and an imaging optical system that converges the at least one beam deflected by said polygonal mirror to form at least one beam spot on a surface to be scanned, the at least one beam spot scanning in the main scanning direction on the surface to be scanned, wherein the at least one beam incident on said polygonal mirror is inclined in an auxiliary scanning direction which is perpendicular to the main scanning direction, wherein at least one lens surface of said imaging optical system is configured such that a beam reflected therefrom is not incident on reflective surfaces of said polygonal mirror, wherein said imaging optical system includes a lens having said at least one lens surface, said lens being positioned such that an optical axis of said lens is perpendicular to a rotational axis of said polygonal mirror.

2. The scanning optical system according to claim 1, wherein a position at which the at least one beam emitted by said light source impinges on said polygonal mirror substantially coincides with an intersection of said polygonal mirror and the optical axis of said lens.

3. The scanning optical system according to claim 2, wherein the intersection substantially coincides with a center position of a reflective surface of said polygonal mirror in a direction of the rotational axis of said polygonal mirror.

4. The scanning optical system according to claim 1, wherein said lens is made of plastic.

5. The scanning optical system according to claim 1, wherein said at least one lens surface is symmetrical with respect to the optical axis of said lens in the auxiliary scanning direction.

6. The scanning optical system according to claim 1, wherein said beam reflected by said at least one lens surface proceeds above a top surface of said polygonal mirror.

7. The scanning optical system according to claim 1, wherein said beam reflected by said at least one lens surface proceeds below a bottom surface of said polygonal mirror.

8. The scanning optical system according to claim 1, wherein said imaging optical system has:
   a scanning lens; and
   a compensation lens provided on the surface to be scanned side with respect to said scanning lens, said compensation lens compensating for curvature of field,
   wherein said scanning lens has said at least one lens surface,
   wherein at least one surface of said scanning lens is formed to be an anamorphic aspherical surface,
   wherein at least one surface of said compensation lens is formed to be an aspherical surface defined by a two-dimensional polynomial expression.

9. The scanning optical system according to claim 8, wherein said at least one lens surface of said scanning lens is symmetrical with respect to an optical axis of said scanning lens in the auxiliary scanning direction.

10. The scanning optical system according to claim 8, wherein one surface of said scanning lens is formed to be an anamorphic aspherical surface, and an other surface of said scanning lens is formed to be a toric surface.

11. The scanning optical system according to claim 1, wherein said at least one beam includes a plurality of beams,
   wherein said polygonal mirror deflects the plurality of beams to scan in the main scanning direction,
   wherein said imaging optical system converges the plurality of beams deflected by said polygonal mirror to form a plurality of beam spots on respective surfaces to be scanned, the plurality of beam spots scanning in the main scanning direction on the respective surfaces to be scanned,
   wherein the plurality of beams incident on said polygonal mirror are inclined in the auxiliary scanning direction.

12. The scanning optical system according to claim 11, wherein said imaging optical system has:
   a scanning lens; and
   a plurality of compensation lenses provided on the surfaces to be scanned side with respect to said scanning lens, each of said compensation lenses compensating for curvature of field,
   wherein the plurality of beams deflected by said polygonal mirror pass through said scanning lens,
   wherein the plurality of beams emerged from said scanning lens pass through the plurality of said compensation lenses, respectively.

13. The scanning optical system according to claim 12, wherein optical paths of the plurality of beams between said polygonal mirror and said scanning lens are symmetrical with respect to an optical axis of said scanning lens.

14. The scanning optical system according to claim 1,
   wherein said lens faces said polygonal mirror,
   wherein said lens and said polygonal mirror are configured so as to satisfy a condition:

$$H/2 < |2\beta D(D-R_{z1})/R_{Z1}| \qquad (1)$$

where H represents a thickness of said polygonal mirror in the auxiliary scanning direction, $\beta$ represents an incident angle of the at least one beam with respect to a reflective surface of said polygonal mirror in the auxiliary scanning direction, D represents a distance between the reflective surface of said polygonal mirror and said lens, and $R_{z1}$ represents a radius of curvature of said at least one lens surface of said lens in the auxiliary scanning direction.

15. The scanning optical system according to claim 1,
   wherein an other surface of said lens is configured such that a beam reflected therefrom proceeds toward an outside region of said polygonal mirror.

16. The scanning optical system according to claim 16,
   wherein said lens faces said polygonal mirror,
   wherein said lens and said polygonal mirror are configured so as to satisfy a condition:

$$H/2 < |\beta D(D-L_z)/L_zL_z = R_{z1}R_{z2}D/(2NR_{z1}D-2(N-1)R_{z2}D-R_{z1}R_{z2}) \qquad (2)$$

where H represents a thickness of said polygonal mirror in the auxiliary scanning direction, $\beta$ represents an incident angle of the at least one beam with respect to a reflective surface of said polygonal mirror in the auxiliary scanning direction, D represents a distance between the reflective surface of said polygonal mirror and said lens, $R_{z1}$ represents a radius of curvature of said at least one lens surface of said lens in the auxiliary scanning direction, $R_{z2}$ represents a radius of curvature of the other lens surface of said lens in the auxiliary scanning direction, and N represents a refractive index of said lens at a design wavelength.

17. A scanning optical system for emitting at least one beam scanning in a main scanning direction, comprising:
   a light source that emits the at least one beam;
   a polygonal mirror that rotates and deflects the at least one beam to scan in the main scanning direction; and
   an imaging optical system that converges the at least one beam deflected by said polygonal mirror to form at least one beam spot on a surface to be scanned, the at least one beam spot scanning in the main scanning direction on the surface to be scanned,
   wherein the at least one beam incident on said polygonal mirror is inclined in an auxiliary scanning direction which is perpendicular to the main scanning direction,
   wherein at least one lens surface of said imaging optical system is configured such that a beam reflected therefrom is not incident on reflective surfaces of said polygonal mirror,
   wherein said imaging optical system includes a lens having said at least one lens surface, said lens facing said polygonal mirror,
   wherein said lens and said polygonal mirror are configured so as to satisfy a condition:

$$H/2 < |2\beta D(D-R_{Z1})/R_{Z1} \qquad (1)$$

where H represents a thickness of said polygonal mirror in the auxiliary scanning direction, β represents an incident angle of the at least one beam with respect to a reflective surface of said polygonal mirror in the auxiliary scanning direction, D represents a distance between the reflective surface of said polygonal mirror and said lens, and $R_{Z1}$ represents a radius of curvature of said at least one lens surface of said lens in the auxiliary scanning direction.

18. The scanning optical system according to claim 17, wherein said lens is made of plastic.

19. The scanning optical system according to claim 17, wherein said at least one lens surface is symmetrical with respect to an optical axis of said lens in the auxiliary scanning direction.

20. The scanning optical system according to claim 17, wherein said beam reflected by said at least one lens surface proceeds above a top surface of said polygonal mirror.

21. The scanning optical system according to claim 17, wherein said beam reflected by said at least one lens surface proceeds below a bottom surface of said polygonal mirror.

22. The scanning optical system according to claim 17, wherein said imaging optical system has: a scanning lens; and
a compensation lens provided on the surface to be scanned side with respect to said scanning lens, said compensation lens compensating for curvature of field,
wherein said scanning lens has said at least one lens surface,
wherein at least one surface of said scanning lens is formed to be an anamorphic aspherical surface,
wherein at least one surface of said compensation lens is formed to be an aspherical surface defined by a two-dimensional polynomial expression.

23. The scanning optical system according to claim 22, wherein said at least one lens surface of said scanning lens is symmetrical with respect to an optical axis of said scanning lens in the auxiliary scanning direction.

24. The scanning optical system according to claim 22, wherein one surface of said scanning lens is formed to be an anamorphic aspherical surface, and an other surface of said scanning lens is formed to be a toric surface.

25. The scanning optical system according to claim 17, wherein said at least one beam includes a plurality of beams,
wherein said polygonal mirror deflects the plurality of beams to scan in the main scanning direction,
wherein said imaging optical system converges the plurality of beams deflected by said polygonal mirror to form a plurality of beam spots on respective surfaces to be scanned, the plurality of beam spots scanning in the main scanning direction on the respective surfaces to be scanned,
wherein the plurality of beams incident on said polygonal mirror are inclined in the auxiliary scanning direction.

26. The scanning optical system according to claim 25, wherein said imaging optical system has:
a scanning lens; and
a plurality of compensation lenses provided on the surfaces to be scanned side with respect to said scanning lens, each of said compensation lenses compensating for curvature of field,
wherein the plurality of beams deflected by said polygonal mirror pass through said scanning lens,
wherein the plurality of beams emerged from said scanning lens pass through the plurality of said compensation lenses, respectively.

27. The scanning optical system according to claim 26, wherein optical paths of the plurality of beams between said polygonal mirror and said scanning lens are symmetrical with respect to an optical axis of said scanning lens.

28. A scanning optical system for emitting at least one beam scanning in a main scanning direction, comprising:
a light source that emits the at least one beam;
a polygonal mirror that rotates and deflects the at least one beam to scan in the main scanning direction; and
an imaging optical system that converges the at least one beam deflected by said polygonal mirror to form at least one beam spot on a surface to be scanned, the at least one beam spot scanning in the main scanning direction on the surface to be scanned,
wherein the at least one beam incident on said polygonal mirror is inclined in an auxiliary scanning direction which is perpendicular to the main scanning direction,
wherein at least one lens surface of said imaging optical system is configured such that a beam reflected therefrom is not incident on reflective surfaces of said polygonal mirror,
wherein said imaging optical system includes a lens having said at least one lens surface,
wherein an other surface of said lens is configured such that a beam reflected therefrom proceeds toward an outside region of said polygonal mirror,
wherein said lens faces said polygonal mirror,
wherein said lens and said polygonal mirror are configured so as to satisfy a condition:

$H/2 < |\beta D(D-L_Z)/L_Z|$ $$L_Z = R_{Z1}R_{Z2}D/(2NR_{Z1}D - 2(N-1)R_{Z2}D - R_{Z1}R_{Z2}) \quad (2)$$

where H represents a thickness of said polygonal mirror in the auxiliary scanning direction, β represents an incident angle of the at least one beam with respect to a reflective surface of said polygonal mirror in the auxiliary scanning direction, D represents a distance between the reflective surface of said polygonal mirror and said lens, $R_{Z1}$ represents a radius of curvature of said at least one lens surface of said lens in the auxiliary scanning direction, $R_{Z2}$ represents a radius of curvature of the other lens surface of said lens in the auxiliary scanning direction, and N represents a refractive index of said lens at a design wavelength.

29. The scanning optical system according to claim 28, wherein said lens is made of plastic.

30. The scanning optical system according to claim 28, wherein said at least one lens surface is symmetrical with respect to an optical axis of said lens in the auxiliary scanning direction.

31. The scanning optical system according to claim 18, wherein said beam reflected by said at least one lens surface proceeds above a top surface of said polygonal mirror.

32. The scanning optical system according to claim 28, wherein said beam reflected by said at least one lens surface proceeds below a bottom surface of said polygonal mirror.

33. The scanning optical system according to claim 28, wherein said imaging optical system has:
a scanning lens; and
a compensation lens provided on the surface to be scanned side with respect to said scanning lens, said compensation lens compensating for curvature of field,
wherein said scanning lens has said at least one lens surface,
wherein at least one surface of said scanning lens is formed to be an anamorphic aspherical surface, wherein at least one surface of said compensation lens is formed to be an aspherical surface defined by a two-dimensional polynomial expression.

34. The scanning optical system according to claim 33, wherein said at least one lens surface of said scanning lens is symmetrical with respect to an optical axis of said scanning lens in the auxiliary scanning direction.

35. The scanning optical system according to claim 33, wherein one surface of said scanning lens is formed to be an anamorphic

36. The scanning optical system according to claim 28, wherein said at least one beam includes a plurality of beams, wherein said polygonal mirror deflects the plurality of beams to scan in the main scanning direction, wherein said imaging optical system converges the plurality of beams deflected by said polygonal mirror to form a plurality of beam spots on respective surfaces to be scanned, the plurality of beam spots scanning in the main scanning direction on the respective surfaces to be scanned, wherein the plurality of beams incident on said polygonal mirror are inclined in the auxiliary scanning direction.

37. The scanning optical system according to claim 36, wherein said imaging optical system has:

a scanning lens; and a plurality of compensation lenses provided on the surfaces to be scanned side with respect to said scanning lens, each of said compensation lenses compensating for curvature of field, wherein the plurality of beams deflected by said polygonal mirror pass through said scanning lens, wherein the plurality of beams emerged from said scanning lens pass through the plurality of said compensation lenses, respectively.

38. The scanning optical system according to claim 37, wherein optical paths of the plurality of beams between said polygonal mirror and said scanning lens are symmetrical with respect to an optical axis of said scanning lens.

* * * * *